US011556777B2

(12) United States Patent
Wang et al.

(10) Patent No.: US 11,556,777 B2
(45) Date of Patent: Jan. 17, 2023

(54) CONTINUOUS CONVOLUTION AND FUSION IN NEURAL NETWORKS

(71) Applicant: UATC, LLC, San Francisco, CA (US)

(72) Inventors: Shenlong Wang, Toronto (CA); Wei-Chiu Ma, Toronto (CA); Shun Da Suo, Toronto (CA); Raquel Urtasun, Toronto (CA); Ming Liang, Toronto (CA)

(73) Assignee: UATC, LLC, Mountain View, CA (US)

( * ) Notice: Subject to any disclaimer, the term of this patent is extended or adjusted under 35 U.S.C. 154(b) by 1023 days.

(21) Appl. No.: 16/175,161

(22) Filed: Oct. 30, 2018

(65) Prior Publication Data

US 2019/0147335 A1 May 16, 2019

Related U.S. Application Data

(60) Provisional application No. 62/586,717, filed on Nov. 15, 2017.

(51) Int. Cl.
*G05D 1/02* (2020.01)
*G06N 3/08* (2006.01)
*G06N 3/04* (2006.01)
*G06K 9/00* (2022.01)

(52) U.S. Cl.
CPC ............. *G06N 3/08* (2013.01); *G05D 1/0248* (2013.01); *G05D 1/0251* (2013.01); *G05D 1/0257* (2013.01); *G06K 9/00* (2013.01); *G06N 3/0454* (2013.01)

(58) Field of Classification Search
CPC .. G05D 1/0248; G05D 1/0251; G05D 1/0257; G06K 9/00; G06N 3/08; G06N 3/0454
See application file for complete search history.

(56) References Cited

U.S. PATENT DOCUMENTS

2017/0140253 A1* 5/2017 Wshah ................. G06N 3/0454
2017/0289409 A1* 10/2017 Min ......................... H04N 5/21
(Continued)

OTHER PUBLICATIONS

Armeni et al., "3D Semantic Parsing of Large-Scale Indoor Spaces", Conference on Computer Vision and Pattern Recognition, Las Vegas, Nevada, Jun. 26-Jul. 1, 2016, 10 pages.
(Continued)

*Primary Examiner* — Calvin Cheung
(74) *Attorney, Agent, or Firm* — Dority & Manning, P.A.

(57) ABSTRACT

Systems and methods are provided for machine-learned models including convolutional neural networks that generate predictions using continuous convolution techniques. For example, the systems and methods of the present disclosure can be included in or otherwise leveraged by an autonomous vehicle. In one example, a computing system can perform, with a machine-learned convolutional neural network, one or more convolutions over input data using a continuous filter relative to a support domain associated with the input data, and receive a prediction from the machine-learned convolutional neural network. A machine-learned convolutional neural network in some examples includes at least one continuous convolution layer configured to perform convolutions over input data with a parametric continuous kernel.

19 Claims, 10 Drawing Sheets

(56) References Cited

U.S. PATENT DOCUMENTS

2018/0173971 A1* 6/2018 Jia ................... G06N 3/084
2018/0189581 A1* 7/2018 Turcot ................ G06N 3/0454

OTHER PUBLICATIONS

Boscaini et al., "Learning Shape Correspondence with Anisotropic Convolutional Neural Networks", Conference on Neural Information Processing Systems, Barcelona, Spain, Dec. 5-10, 2016, 9 pages.
Bronstein et al., "Geometric Deep Learning: Going Beyond Euclidean Data", IEEE Signal Processing Magazine, Jul. 2017, pp. 18-42.
Bruna et al., Spectral Networks and Locally Connected Networks on Graphs, arXiv:1312.6203v3, May 21, 2014, 14 pages.
Caflisch, "Monte Carlo and Quasi-Monte Carlo Methods", Acta Numerica, 1998, pp. 1-49.
Defferrard et al., "Convolutional Neural Networks on Graphs with fast Localized Spectral Filtering", Conference on Neural Information Processing Systems, Barcelona, Spain, Dec. 5-10, 2016, 9 pages.
Duvenaud et al., "Convolutional Networks on Graphs for Learning Molecular Fingerprints", Conference on Neural Information Processing Systems, Montreal, Canada, Dec. 7-12, 2015, 9 pages.
Geiger et al., "Are We Ready for Autonomous Driving? The Kitti Vision Benchmark Suite", Conference on Computer Vision and Pattern Recognition, Boston, Massachusetts, Jun. 8-10, 2015, 8 pages.
Graham et al., Submanifold Sparse Convolutional Networks, arXiv:1706.01307v1, Jun. 5, 2017, 10 pages.
Gupta et al., Learning Rich Features from RGB-D linages for Object Detection and Segmentation, arXiv:1407.5736v1, Jul. 22, 2014, 16 pages.
He et al., "Deep Residual Learning for Image Recognition", Conference on Computer Vision and Pattern Recognition, Barcelona, Spain, Dec. 5-10, 2016, 9 pages.
Hornik, "Approximation Capabilities of Multilayer Feed-Forward Networks", Neural Networks, vol. 4, 1991, pp. 251-257.
Jia et al., "Dynamic Filter Networks", Conference on Neural Information Processing Systems, Barcelona, Spain, Dec. 5-10, 2016, 9 pages.
Kingma et al., "ADAM: A Method for Stochastic Optimization", arXiv:1412.6980v9, Jan. 30, 2017, 15 pages.
Kipf et al., "Semi-Supervised Classification with Graph Convolutional Networks", arXiv:1609.02907v4, Feb. 22, 2017, 14 pages.
Li et al., "Gated Graph Sequence Neural Networks", arXiv:1511.05493v4, Sep. 22, 2017, 20 pages.
Long et al., "Fully Convolutional Networks for Semantic Segmentation", Conference on Computer Vision and Pattern Recognition, Boston, Massachusetts, Jun. 8-10, 2015, 10 pages.
Masci et al., "Geodesic Convolutional Neural Networks on Riemannian Manifolds", arXiv:1501.06297, Jan. 26, 2015, 9 pages.
Maturana et al., "Voxnet: A 3D Convolutional Neural Network for Real-Time Object Recognition", International Conference on Intelligent Robots and Systems, Hamburg, Germany, Sep. 28-Oct. 2, 2015, 7 pages.
Monti et al., "Geometric Deep Learning on Graphs and Manifolds Using Mixture Model CNNs", Conference on Computer Vision and Pattern Recognition, Honolulu, Hawaii, Jul. 21-26, 2017, 10 pages.
Qi et al., "Pointnet: Deep Learning on Point Sets for 3D Classification and Segmentation", Conference on Computer Vision and Pattern Recognition, Barcelona, Spain, Dec. 5-10, 2016, 9 pages.
Qi et al., "Volumetric and Multi-View CNNs for Object Classification on 3D Data", Conference on Computer Vision and Pattern Recognition, Barcelona, Spain, Dec. 5-10, 2016, 9 pages.
Qi et al., "Pointnet++: Deep Hierarchical Feature Learning on Point Sets in a Metric Space", Long Beach, California, Dec. 4-9, 2017, 10 pages.
Qi et al., "3D Graph Neural Networks for RGBD Semantic Segmentation", Conference on Computer Vision and Pattern Recognition, Honolulu, Hawaii, Jul. 21-26, 2017, 10 pages.
Riegler et al., "OctNet: Learning Deep 3D Representations at High Resolutions", Conference on Computer Vision and Pattern Recognition, Honolulu, Hawaii, Jul. 21-26, 2017, 10 pages.
Scarselli et al., "The Graph Neural Network Model", IEEE Transactions on Neural Networks, vol. 20, No. 1, Jan. 2009, 20 pages.
Schütt, et al., SchNet: A Continuous-Filter Convolutional Neural Network for Modeling Quantum Interactions, arXiv:1706.08566v5, Dec. 19, 2017, 11 pages.
Simonovsky et al., "Dynamic Edge-Conditioned Filters in Convolutional Neural Networks on Graphs", Conference on Computer Vision and Pattern Recognition Honolulu, Hawaii, Jul. 21-26, 2017, 10 pages.
Su et al., "Multiview Convolutional Neural Networks for 3D Shape Recognition", 2015 IEEE International Conference on Computer Vision (ICCV), Dec. 7-13, 2015, 9 pages.
Tchapmi et al., "SEGCloud: Semantic Segmentation of 3D Point Clouds", arXiv:1710.07563v1, Oct. 20, 2017, 21 pages.
Wu et al., "3D ShapeNets: A Deep Representation for Volumetric Shapes", Conference on Computer Vision and Pattern Recognition, Boston, Massachusetts, Jun. 8-10, 2015, 9 pages.
Yi et al., "SvncSpecCNN: Synchronized Spectral CNN for 3D Shape Segmentation", Conference on Computer Vision and Pattern Recognition, Honolulu, Hawaii, Jul. 21-26, 2017, 9 pages.

* cited by examiner

CONTINUOUS CONVOLUTION AND FUSION IN NEURAL NETWORKS

RELATED APPLICATION

This application claims priority to and the benefit of U.S. Provisional Patent Application No. 62/586,717, titled "Deep Parametric Continuous Convolutional Neural Networks," and filed on Nov. 15, 2017. U.S. Provisional Patent Application No. 62/586,717 is hereby incorporated by reference herein in its entirety.

FIELD

The present disclosure relates generally to improving convolution and fusion in machine-learned models.

BACKGROUND

Many systems such as autonomous vehicles, robotic systems, and user computing devices are capable of sensing their environment and performing operations without human input. For example, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

Many systems can include or otherwise employ one or more machine-learned models such as, for example, artificial neural networks for a variety of tasks. Artificial neural networks (ANNs or "neural networks") are an example class of machine-learned models. Neural networks can be trained to perform a task (e.g., make a prediction) by learning from training examples, without task-specific programming. For example, in image recognition, neural networks might learn to identify images that contain a particular object by analyzing example images that have been manually labeled as including the object or labeled as not including the object.

A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

One example class of neural networks is convolutional neural networks. In some instances, convolutional neural networks can be deep, feed-forward artificial neural networks that include one or more convolution layers. For example, a convolutional neural network can include tens of layers, hundreds of layers, etc. Each convolution layer can perform convolutions over input data using learned filters. Filters can also be referred to as kernels. Convolutional neural networks have been successfully applied to analyzing imagery of different types, including, for example, visual imagery.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle that includes one or more sensors that generate sensor data relative to the autonomous vehicle, one or more processors, and one or more non-transitory computer-readable media that store instructions that, when executed by the one or more processors, cause the autonomous vehicle to perform operations. The operations include providing sensor data from the one or more sensors to a machine-learned convolutional neural network including one or more continuous convolution layers, performing one or more convolutions over the sensor data with at least one of the one or more convolution layers using a parametric continuous kernel, and receiving a prediction from the machine-learned convolutional neural network based at least in part on the one or more convolutions performed over the sensor data.

Another example aspect of the present disclosure is directed to one or more non-transitory computer-readable media that store a machine-learned convolutional neural network that comprises one or more convolution layers, wherein at least one of the one or more convolution layers is configured to perform convolutions over input data with a parametric continuous kernel.

Yet another example aspect of the present disclosure is directed to a computing system. The computing system includes one or more processors and one or more non-transitory computer-readable media that store a machine-learned neural network and instructions that, when executed by the one or more processors, cause the computing system to perform operations. The machine-learned neural network comprises one or more fusion layers, wherein at least one of the one or more fusion layers is configured to fuse input data of different modalities. The operations comprise receiving, at the machine-learned neural network, a target data point in a target domain having a first modality, extracting with the machine-learned neural network a plurality of source data points from a source domain having a second modality based on a distance of each source data point to the target data point, and fusing information from the plurality of source data points in the one or more fusion layers to generate an output feature at the target data point in the target domain.

Other example aspects of the present disclosure are directed to systems, methods, vehicles, apparatuses, tangible, non-transitory computer-readable media, and memory devices for determining the location of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
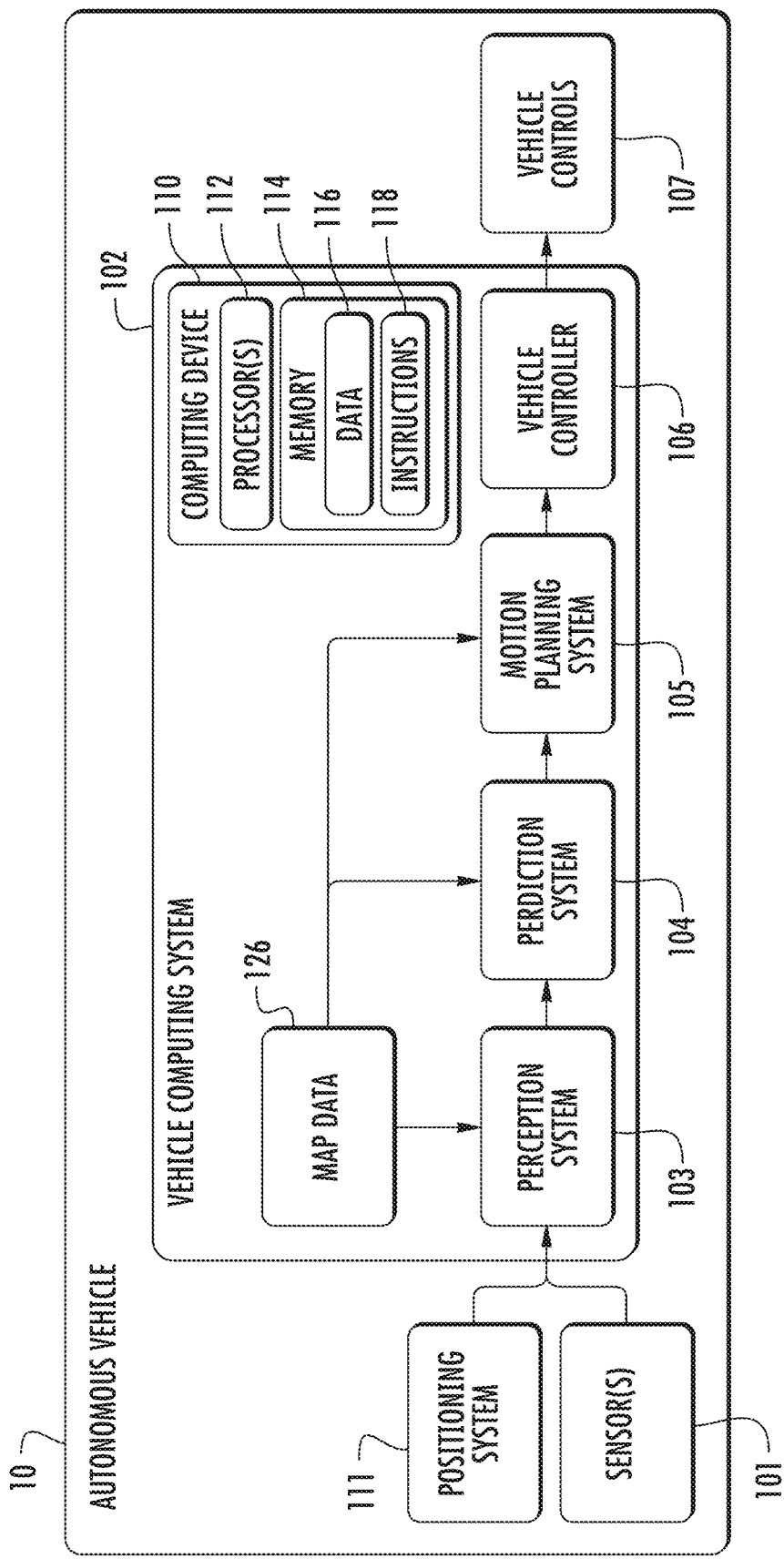
FIG. 1 depicts a block diagram of an example autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to machine-learned models including convolutional neural networks that are configured to generate predictions using continuous convolution techniques. In example embodiments, the convolutional neural network can include one or more continuous convolution layers and a filter that is continuous over an input or support domain associated with the sensor data. One or more convolutions of input sensor data can be performed in the continuous convolution layer using the filter in order to generate predictions. For instance, predictions including object classifications (e.g., semantic labels) or motion predictions for physical objects in an environment associated with an autonomous vehicle, non-autonomous vehicle, user computing device, robotic system, etc. can be determined.

In some examples, the systems and methods of the present disclosure can be included in or otherwise leveraged by an autonomous vehicle or other system. More particularly, in some implementations, a computing system can receive sensor data from one or more sensors that generate sensor data relative to an autonomous vehicle or other system. An autonomous vehicle or other system can include a plurality of sensors (e.g., a LIDAR system, cameras, etc.) configured to obtain sensor data associated with the system's surrounding environment as well as the position and movement of the system (e.g., autonomous vehicle). The computing system can input the sensor data to a machine-learned model that includes one or more convolutional neural networks that are continuous over a support domain. More particularly, the convolutional neural networks may include or otherwise access a filter such as a kernel that is defined continuously over the support domain associated with the input sensor data. Using the one or more convolutional neural networks, one or more convolutions over the sensor data can be performed with the filter. For each output point of the set of output points in an output domain, a prediction can be received from the convolutional neural network based on the one or more convolutions performed on the sensor data.

More particularly, in some implementations, one or more convolution layers of a convolutional neural network may be configured to generate predictions based on a plurality of input data. One or more inputs of a continuous convolution layer may be configured to receive a set of input features associated with sensor data, a set of input points in a support domain of the sensor data, and a set of output points in an output domain. The convolution layers can be configured to perform continuous convolution for an output point in the output domain. The continuous filter may include a kernel. The kernel can be defined for arbitrary points in the continuous support domain. As result, it may be possible to generate output features for output points for which there is no input data at a corresponding input point in the support domain.

Accordingly, a continuous convolutional neural network can perform convolutions over an uneven distribution of points in the support domain. The kernel can process arbitrary data structures, such as point clouds captured from three-dimensional sensors where the point clouds may be distributed unevenly in a continuous domain. This permits the continuous convolutional neural network to generate output features in association with output points in an output domain for which there is no corresponding input feature in a support domain. In various examples, the kernel may operate over input data including unstructured input data or non-grid structured input data. The input data may include three-dimensional point clouds, such as a three-dimensional point cloud of LIDAR data generated by a LIDAR sensor. The input data can be structured in multidimensional Euclidean space in some examples.

The kernel can be configured to provide output features at arbitrary points over the continuous support domain. In some examples, the kernel is a multilayer perceptron. Parametric continuous functions can be used to model a continuous kernel function to provide a feasible parameterization for continuous convolution. The multilayer perceptron may be used as an approximator, being an expressive function that is capable of approximating continuous functions. This enables the kernel function to span a full continuous support domain while remaining parameterizable by a finite number of parameters. In other examples, polynomials may be used.

The kernel can include a parameteric kernel function that spans a full continuous vector space of a continuous support domain. The parametric kernel function can perform convolutions over input data having a number of input points in the support domain that is less than a number of output points in an output domain.

In some examples, the convolutional neural network may apply a weighted sum to input features at supporting point locations in a support domain. The weighted sum may be applied based on supporting point weights determined from supporting point locations associated with output point locations in the output domain. For example, input data can be provided to one or more convolution layers. Based on the input data, a set of input features and a corresponding set of input point locations in the support domain can be determined. A set of supporting point locations in the support domain can be determined based at least in part on the set of output point locations in the output domain and the set of input point locations. A set of output features in the output domain can be generated using at least one convolution layer based at least in part on the set of input features, the set of input point locations, and the set of supporting point locations. In some examples the set of supporting point weights can be determined based at least in part on the set of supporting point locations. A set of supporting point features can be determined based at least in part on the set of input point features and the set of output point locations. The weighted sum can then be applied to the set of supporting point features based on the set of supporting point weights in order to generate the set of output point features.

According to some implementations, an influence of a continuous filter such as a parametric continuous kernel can be constrained by a modulating window function. In some examples, the modulating window function may retain only non-zero kernel values for K-nearest neighbors. In other examples, the modulating window function may use a receptive field to only keep non-zero kernel values for points within a fixed radius.

In some implementations, efficient continuous convolution may be provided using a locality enforcing formulation to constrain the cardinality of the support domain locations. Further, in some examples, the parametric continuous kernel computation can be factorized if the kernel function value across different output dimensionality is shared. Accordingly, a weight tensor of a continuous convolution layer can be decomposed into two decomposition tensors. For example, the two decomposition tensors may include one weight tensor comprising a linear weight matrix for input transformation and another weight tensor that is evaluated through a multilayer perceptron. This optimization may reduce the number of kernel evaluations that need to be computed and stored. Additionally, the parametric continuous kernel function can be shared across different layers, such that evaluation can be performed once for all layers in some examples.

In some examples, the convolutional neural network can include at least two continuous convolution layers. The convolutional neural network may include one or more residual connections between the at least two continuous convolution layers.

According to some examples, a continuous convolution layer may include an indexing component configured to receive a set of input point features and a set of input point locations associated with the input features. The indexing component may additionally receive supporting point information such as indices generated from output point locations. For example, the continuous convolution layer can receive a set of output locations and select for each output location a corresponding set of supporting point indices utilizing a k-dimensional tree component. The indexing component can generate a set of supporting point locations and a set of supporting point features. The supporting point locations may be provided to one or more fully convolution layers in order to generate a supporting point weight for each supporting point location. The supporting point weights can be provided to a weighted sum component which also receives the set of supporting point features from the indexing component. The weighted sum component can generate a set of output point features based on the supporting point features and supporting point weights.

In some implementations, a computing system is configured to train a machine-learned model including a continuous convolutional neural network. More particularly, one or more continuous layers of a continuous convolutional neural network including a continuous filter relative to a support domain can be trained. Training the one or more continuous layers may include training an operator such as a parametric continuous kernel function. In a specific example, the final output of a continuous convolutional neural network including output features, object detections, object classifications, or motion estimations may be used to train the network end-to-end using cross entropy loss. In some examples an optimizer may be used. Training and validation can be performed using a large training data set, including annotated frames, sequences of frames, images, etc. In some implementations, the neural network may be trained from scratch using an optimizer to minimize a class-reweighted cross entropy loss. For instance, voxel-wise predictions can be mapped back to original points and metrics computed over points.

As an example, in some implementations, an autonomous vehicle can include one or more machine-learned models configured to generate predictions including object classifications based on sensor data. The object classifications may include semantic labels for one or more portions of the sensor data. For example, the machine-learned model may generate object segments corresponding to predicted physical objects in an environment external to the autonomous vehicle. The semantic label may include a class identifier applied to one or more portions of the sensor data such as pixels in an image or points in a point cloud associated with the object segment. In example embodiments, the object segments may correspond to vehicles, pedestrians, bicycles, etc. and be used by an autonomous vehicle as part of motion estimation and/or planning.

As another example, in some implementations, an autonomous vehicle can include one or more machine-learned models configured to generate predictions including object motion estimations based on sensor data. For instance, the object motion estimations may include predicted object trajectories or other predictions corresponding to physical objects in an environment external to an autonomous vehicle. In some implementations, a prediction system can compute a predicted trajectory of an object using one or more continuous convolutional neural networks. The predicted trajectory may be provided to a motion planning system which determines a motion plan for the autonomous vehicle based on the predicted trajectories.

An autonomous vehicle according to example embodiments may include a perception system having one or more machine-learned models that have been trained to generate predictions using continuous convolution techniques. The perception system can include one or more deep neural networks such as one or more convolutional neural networks that have been trained over raw sensor data, such as three-dimensional point clouds, in an end-to-end manner. In some examples, the perception system may include a segmentation component having one or more convolutional neural networks configured to perform segmentation functions. The segmentation component may perform semantic segmentation of imagery. The semantic segmentation may include generating a class or semantic label for each point of an output domain associated with sensor data. The perception system may additionally include a tracking component having one or more convolutional neural networks configured to perform motion estimation, such as estimating the motion of points in the output domain associated with the sensor data.

In accordance with some examples, a neural network may include one or more continuous fusion layers configured to fuse information from multi-modality data. A continuous fusion layer can generate a dense representation under one modality where a data point contains features extracted from two or more modalities. A nearest neighbors technique can be used to extract data points in a source domain based on a target domain in a different modality. Such an approach can overcome difficulties of multi-modal data fusion in situations where not all of the data points in one modality are observable in another modality. A continuous fusion approach may overcome problems associated with both sparsity in input data (e.g., sensor observations) and the handling of spatially-discrete features in some input data (e.g., camera-view images). A continuous fusion layer may be used within any layer of a machine-learned model, such as at an early, middle, and/or late layer in a set of layers of a model. A continuous fusion layer may be used with one or more convolutional layers in some examples. In other examples, a continuous fusion layer may be used independently of a continuous convolution layer.

According to some aspects, a machine-learned neural network may include one or more fusion layers, wherein at least one of the one or more fusion layers is configured to fuse input data of different modalities. The fusion layer(s) can include a multi-layer perceptron. The multi-layer perceptron can have a first portion configured to extract a plurality of source data points from a source domain given a data point in a target domain. The multi-layer perceptron can have a second portion configured to encode an offset between each of the plurality of source data points from the source domain and the target data point in the target domain.

The systems and methods of the present disclosure provide a number of technical effects and benefits. In one example, a machine-learned model is provided with at least one continuous convolution layer that permits convolution over a full, continuous vector space. Such a generalization permits learning over arbitrary data structures having a computable support relationship. Traditionally, convolutional neural networks assume a grid structured input and perform discrete convolutions as a fundamental building block. Discrete convolutions may rely on a dense grid structure (e.g., a two-dimensional grid for images or a three-dimensional grid for videos). However, many real-world applications such as visual perception from three-dimensional point clouds, mesh registration, and non-rigid shape correspondences may rely on making statistical predictions from non-grid structured data. Accordingly, a continuous convolutional technique in accordance with embodiments of the disclosed technology can be provided to generate predictions based on non-grid structured data.

Additionally, a learnable or trainable operator is provided that enables a computing system to operate over non-grid structured data in order to generate predictions. A trainable operator enables a computing system to generate dense predictions based on partial observations without grid structured data. Unlike discrete convolutions conducted over the same point set, the input points and output points of a continuous convolution layer can be different. This may have particular benefit for practical applications where high resolution predictions are desired from sparse data sets or partial observations. For example, high-resolution predictions can be generated from arbitrary data structures such as point clouds captured from 3D sensors that may be distributed unevenly in a continuous domain.

Additionally, expressive deep neural networks can be provided using parameterized continuous filters over a continuous domain. Because a kernel can be defined over an infinite number of points, one or more parametric continuous functions can be used to model the continuous kernel function. Parametric continuous convolutions may use a parameterized kernel function that spans the full continuous vector space and thus, is not limited to dense grid structured data. In this manner, parameterized kernel functions that span a full continuous vector space can be exploited. The use of parametric continuous convolutions can improve predictions generated by neural networks for tasks such as object classifications (e.g., semantic labeling) and motion estimation based on sensor data such as point clouds.

The use of parametric continuous functions may provide increased computing efficiencies and reduced memory constraints. For example, the computing system can perform predictions with significantly reduced times and with greater accuracy. In some instances, a parametric continuous kernel can be shared between two or more continuous convolution layers to provide increased computing efficiency. This can reduce the amount of processing required to implement the machine-learned model, and correspondingly, improve the speed at which predictions can be obtained.

In some examples, a machine-learned model includes one or more continuous fusion layers capable of fusing information from multi-modality data. Such an approach can provide a solution for data fusion where there exists sparsity in the input data and/or where there are spatially-discrete features (e.g., in camera view images). A continuous fusion approach permits the fusion of data from different modalities where all of the data points in one modality may not be observable in another modality. By identifying a group of neighboring data points using a calibration technique, such disparities can be accommodated. Such an approach can save memory and processing requirements associated with other approaches. Additionally, such an approach may enable fusing of multi-modal data associated with different sensors. For example, camera image data can be fused with LIDAR sensor data, even where the domains associated with each sensor are not the same.

Thus, a computing system can more efficiently and accurately classify objects from sensor data and/or estimate motion of the objects using techniques described herein. By way of example, the more efficient and accurate generate of object classifications and motion estimations can improve the operation of self-driving cars or object manipulation in robotics. A perception system can incorporate one or more of the systems and methods described herein to improve the classification and motion estimation of objects within a surrounding environment based on sensor data. The data generated using the continuous convolution techniques and/or continuous fusion techniques described herein can help improve the accuracy of the state data used by the autonomous vehicle.

Although the present disclosure is discussed with particular reference to autonomous vehicles, the systems and methods described herein are applicable to convolution and fusion in machine-learned models for a variety of applications by other systems. For example, the techniques described herein can be implemented and utilized by other computing systems such as, for example, user devices, robotic systems, non-autonomous vehicle systems, etc. (e.g., for object detection, classification, and/or motion estimation). Further, although the present disclosure is discussed with particular reference to certain networks, the systems and methods described herein can also be used in conjunction with many different forms of machine-learned models in addition or alternatively to those described herein. The reference to implementations of the present disclosure with respect to an autonomous vehicle is meant to be presented by way of example and is not meant to be limiting.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes a computing device 110 including one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object as described. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine one or more motion plans for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at their current and/or future locations.

As one example, in some implementations, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

The motion planning system 105 can provide the optimal motion plan to a vehicle controller 106 that controls one or more vehicle controls 107 (e.g., actuators or other devices that control gas flow, steering, braking, etc.) to execute the optimal motion plan. The vehicle controller can generate one or more vehicle control signals for the autonomous vehicle based at least in part on an output of the motion planning system.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Figure 2:
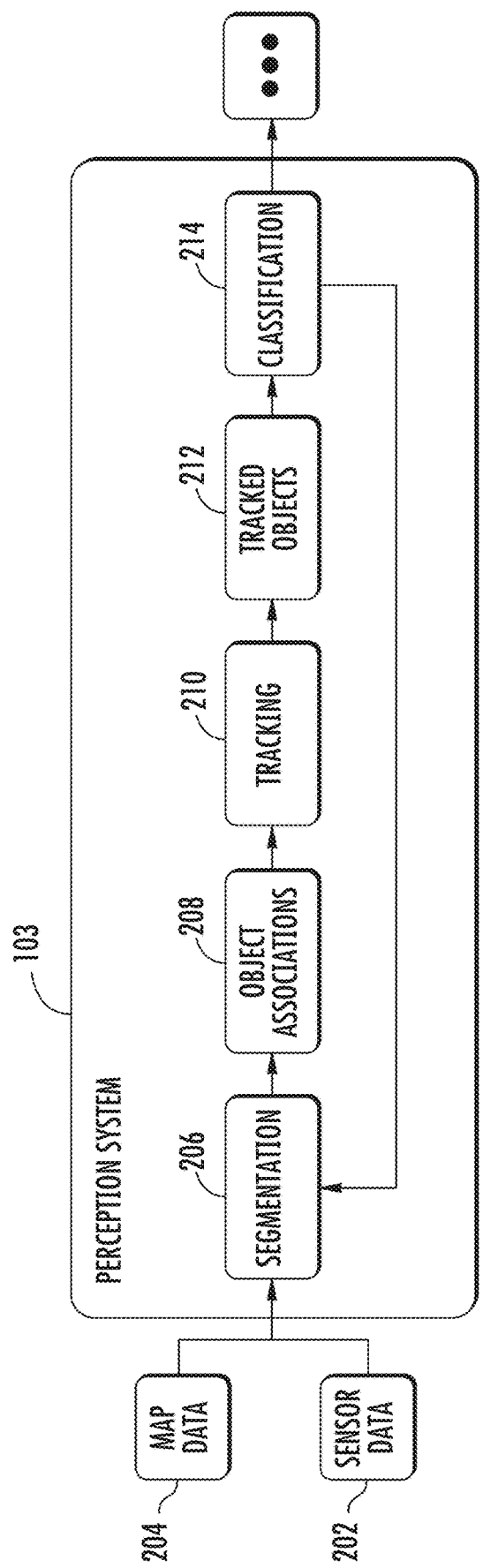
FIG. 2 depicts a block diagram of an example perception system according to example embodiments of the present disclosure.

FIG. 2 depicts a block diagram of an example perception system 103 according to example embodiments of the present disclosure. As discussed in regard to FIG. 1, a vehicle computing system 102 can include a perception system 103 that can identify one or more objects that are proximate to an autonomous vehicle 10. In some embodiments, the perception system 103 can include segmentation component 206, object associations component 208, tracking component 210, tracked objects component 212, and classification component 214. The perception system 103 can receive sensor data 202 (e.g., from one or more sensor(s) 101 of the autonomous vehicle 10) and map data 204 as input. The perception system 103 can use the sensor data 202 and the map data 204 in determining objects within the surrounding environment of the autonomous vehicle 10. In some embodiments, the perception system 103 iteratively processes the sensor data 202 to detect, track, and classify objects identified within the sensor data 202. In some examples, the map data 204 can help localize the sensor data to positional locations within a map data or other reference system.

Within the perception system 103, the segmentation component 206 can process the received sensor data 202 and map data 204 to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 103. The classification component 214 can receive the data from tracked objects component 212 and classify each of the object instances. For example, classification component 214 can classify a tracked object as an object from a predetermined set of objects (e.g., a vehicle, bicycle, pedestrian, etc.). The perception system 103 can provide the object and state data for use by various other systems within the vehicle computing system 102, such as the prediction system 104 of FIG. 1.

Figure 3:
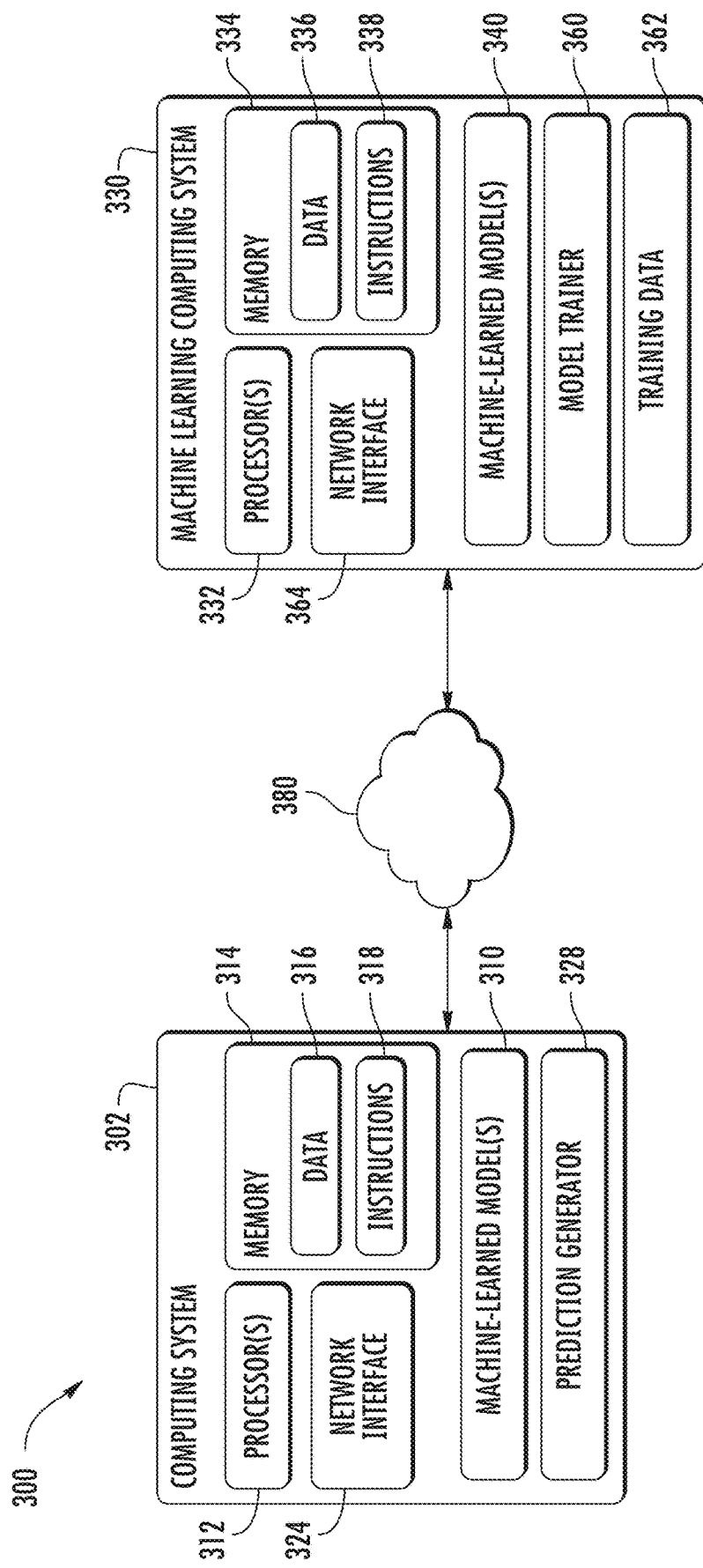
FIG. 3 depicts a block diagram of an example computing system according to example embodiments of the present disclosure.

FIG. 3 depicts a block diagram of an example computing system 300 according to example embodiments of the present disclosure. The example computing system 300 includes a computing system 302 and a machine learning computing system 330 that are communicatively coupled over a network 380.

In some implementations, the computing system 302 can perform sensor data analysis, including object detection, classification, and/or motion estimation. In some implementations, the computing system 302 can be included in an autonomous vehicle. For example, the computing system 302 can be on-board the autonomous vehicle. In other implementations, the computing system 302 is not located on-board the autonomous vehicle. For example, the computing system 302 can operate offline to perform object classification and motion estimation. The computing system 302 can include one or more distinct physical computing devices.

The computing system 302 includes one or more processors 312 and a memory 314. The one or more processors 312 can be any suitable processing device (e.g., a processor core, a microprocessor, an ASIC, a FPGA, a controller, a microcontroller, etc.) and can be one processor or a plurality of processors that are operatively connected. The memory 314 can include one or more non-transitory computer-readable storage media, such as RAM, ROM, EEPROM, EPROM, one or more memory devices, flash memory devices, etc., and combinations thereof.

The memory 314 can store information that can be accessed by the one or more processors 312. For instance, the memory 314 (e.g., one or more non-transitory computer-readable storage mediums, memory devices) can store data 316 that can be obtained, received, accessed, written, manipulated, created, and/or stored. The data 316 can include, for instance, imagery captured by one or more sensors or other forms of imagery, as described herein. In some implementations, the computing system 302 can obtain data from one or more memory device(s) that are remote from the computing system 302.

The memory 314 can also store computer-readable instructions 318 that can be executed by the one or more processors 312. The instructions 318 can be software written in any suitable programming language or can be implemented in hardware. Additionally, or alternatively, the instructions 318 can be executed in logically and/or virtually separate threads on processor(s) 312.

For example, the memory 314 can store instructions 318 that when executed by the one or more processors 312 cause the one or more processors 312 to perform any of the operations and/or functions described herein, including, for example, object detection, classification, and/or motion estimation.

According to an aspect of the present disclosure, the computing system 302 can store or include one or more machine-learned models 310. As examples, the machine-learned models 310 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, and/or other forms of neural networks, or combinations thereof. According to example embodiments, the machine-learned models 310 can be or otherwise include a continuous convolutional neural network including one or more continuous convolution layers. At least one of the one or more continuous convolution layers can include a continuous filter, such as a parametric continuous kernel.

In some implementations, the computing system 302 can receive the one or more machine-learned models 310 from the machine learning computing system 330 over network 380 and can store the one or more machine-learned models 310 in the memory 314. The computing system 302 can then use or otherwise implement the one or more machine-learned models 310 (e.g., by processor(s) 312). In particular, the computing system 302 can implement the machine-learned model(s) 310 to perform object classification and motion estimation. In one example, object classification and motion estimation can be performed using sensor data such as RGB data from an image capture device or point cloud data from a LIDAR sensor. The sensor data may include imagery captured by one or more sensors of an autonomous vehicle and the machine-learned model (e.g., convolutional neural network) can detect object(s) in a surrounding environment of the autonomous vehicle, as depicted by the imagery. In another example, the imagery can include imagery captured by one or more sensors of an autonomous vehicle and the machine-learned model (e.g., convolutional neural network) can predict a trajectory for an object in a surrounding environment of the autonomous vehicle.

The machine learning computing system 330 includes one or more processors 332 and a memory 334. The one or more processors 332 can be any suitable processing device (e.g., a processor core, a microprocessor, an ASIC, a FPGA, a controller, a microcontroller, etc.) and can be one processor or a plurality of processors that are operatively connected. The memory 334 for can include one or more non-transitory computer-readable storage media, such as RAM, ROM, EEPROM, EPROM, one or more memory devices, flash memory devices, etc., and combinations thereof.

The memory 334 can store information that can be accessed by the one or more processors 332. For instance, the memory 334 (e.g., one or more non-transitory computer-readable storage mediums, memory devices) can store data 336 that can be obtained, received, accessed, written, manipulated, created, and/or stored. The data 336 can include, for instance, imagery as described herein. In some implementations, the machine learning computing system 330 can obtain data from one or more memory device(s) that are remote from the system 330.

The memory 334 can also store computer-readable instructions 338 that can be executed by the one or more processors 332. The instructions 338 can be software written in any suitable programming language or can be implemented in hardware. Additionally, or alternatively, the instructions 338 can be executed in logically and/or virtually separate threads on processor(s) 332.

For example, the memory 334 can store instructions 338 that when executed by the one or more processors 332 cause the one or more processors 332 to perform any of the operations and/or functions described herein, including, for example, object classification and motion estimation.

In some implementations, the machine learning computing system 330 includes one or more server computing devices. If the machine learning computing system 330 includes multiple server computing devices, such server computing devices can operate according to various computing architectures, including, for example, sequential computing architectures, parallel computing architectures, or some combination thereof.

In addition or alternatively to the machine-learned model(s) 310 at the computing system 302, the machine learning computing system 330 can include one or more machine-learned models 340. As examples, the machine-learned models 340 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. According to example embodiments, the machine-learned models 340 can be or otherwise include a continuous convolutional neural network including one or more continuous convolution layers. At least one of the one or more continuous convolution layers can include a continuous filter, such as a parametric continuous kernel.

As an example, the machine learning computing system 330 can communicate with the computing system 302 according to a client-server relationship. For example, the machine learning computing system 330 can implement the machine-learned models 340 to provide a web service to the computing system 302. For example, the web service can provide object classification and motion estimation.

Thus, machine-learned models 310 can located and used at the computing system 102 and/or machine-learned models 340 can be located and used at the machine learning computing system 130.

The computing system 302 can also include prediction generator 328. The prediction generator 328 can generate predictions such as object detections, classifications, and/or motion estimations based on input data. For example, the prediction generator 3028 can perform some or all of steps 602-608 of FIG. 6 as described herein. The prediction generator 128 can be implemented in hardware, firmware, and/or software controlling one or more processors. In another example, machine learning computing system 330 may include a prediction generator 328 in addition to or in place of the prediction generator 328 at computing system 302.

In one example, prediction generator 328 can be configured to obtain and provide input data to a machine-learned model 310 or 340 including a convolutional neural network. The prediction generator 328 can perform one or more convolutions over the input data using a continuous filter of the machine-learned convolutional neural network relative to a support domain of the input data. The continuous filter may include a parametric continuous kernel. The prediction generator 128 can receive a prediction from the machine-learned convolutional neural network based at least in part on convolutions performed over the input data using the continuous filter.

In some implementations, the machine learning computing system 330 and/or the computing system 302 can train the machine-learned models 310 and/or 340 through use of a model trainer 360. The model trainer 360 can train the machine-learned models 310 and/or 340 using one or more training or learning algorithms. One example training technique is backwards propagation of errors. In some implementations, the model trainer 360 can perform supervised training techniques using a set of labeled training data. In other implementations, the model trainer 360 can perform unsupervised training techniques using a set of unlabeled training data. The model trainer 360 can perform a number of generalization techniques to improve the generalization capability of the models being trained. Generalization techniques include weight decays, dropouts, or other techniques.

In particular, the model trainer 360 can train a machine-learned model 310 and/or 340 based on a set of training data 362. The training data 362 can include, for example, training images labelled with a "correct" prediction. The model trainer 360 can be implemented in hardware, firmware, and/or software controlling one or more processors.

More particularly, in some implementations, model trainer can input training data to a machine-learned model 340 including one or more continuous convolution layers. The training data may include sensor data that has been annotated to indicate objects represented in the sensor data, or any other suitable ground truth data that can be used to train a model. The computing system can detect an error associated with one or more predictions generated by the machine-learned model relative to the annotated sensor data over a sequence of the training data. The computing system can backpropagate the error associated with the one or more predicted object trajectories to the one or more continuous convolution layers. In one example, a model 340 can be trained from scratch using an optimizer to minimize class-reweighted cross-entropy loss. Voxel-wise predictions can be mapped back to original point and metrics can be computed over points. In some implementations, the machine-learned-model is trained end-to-end using deep learning. In this manner, the computations for predictions can be learned. Additionally, a parametric continuous kernel can be learned. In some examples, this includes learning a size of the parametric continuous kernel. After training, the machine-learned model can be used by an autonomous vehicle for generating motion plans for the autonomous vehicle.

The computing system 302 can also include a network interface 324 used to communicate with one or more systems or devices, including systems or devices that are remotely located from the computing system 302. The network interface 324 can include any circuits, components, software, etc. for communicating with one or more networks (e.g., 380). In some implementations, the network interface 324 can include, for example, one or more of a communications controller, receiver, transceiver, transmitter, port, conductors, software and/or hardware for communicating data. Similarly, the machine learning computing system 330 can include a network interface 364.

The network(s) 380 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 3 illustrates one example computing system 300 that can be used to implement the present disclosure. Other computing systems can be used as well. For example, in some implementations, the computing system 302 can include the model trainer 360 and the training data 362. In such implementations, the machine-learned models 310 310 can be both trained and used locally at the computing system 302. As another example, in some implementations, the computing system 302 is not connected to other computing systems.

In addition, components illustrated and/or discussed as being included in one of the computing systems 302 or 330 can instead be included in another of the computing systems 302 or 330. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Standard convolutional neural networks typically assume the availability of a grid structured input and based on this assumption, exploit discrete convolutions as a fundamental building block of the network. This approach may have limited applicability to many real-world applications. For example, the inputs for many real-world applications such as visual perception from 3D point clouds, etc. may rely on statistical predictions from non-grid structured data. In some instances, particularly those encountered by autonomous vehicle control systems, the input data such as sensor data including input imagery may be sparse in nature. For example, the input data may include LIDAR imagery produced by a LIDAR system, such as a three-dimensional point clouds, where the point clouds can be highly sparse. By way of example, a 3D point cloud can describe the locations of detected objects in three-dimensional space. For many locations in the three-dimensional space, there may not be an object detected at such location. Additional examples of sensor data include imagery captured by one or more cameras or other sensors include, as examples: visible spectrum imagery (e.g., humanly-perceivable wavelengths); infrared imagery; imagery that depicts RADAR data produced by a RADAR system; heat maps; data visualizations; or other forms of imagery.

Figure 4:
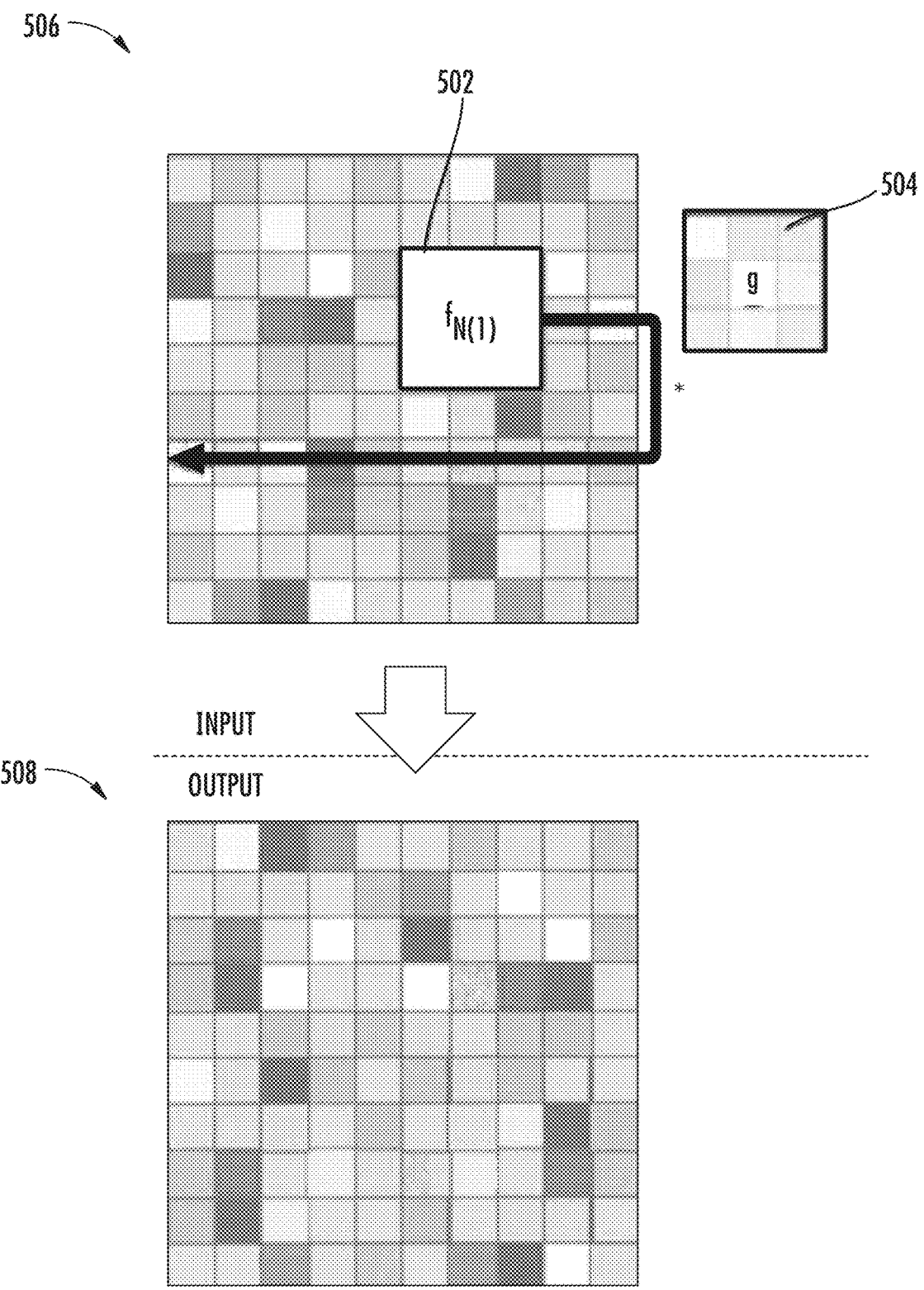
FIG. 4 depicts grid-based convolution of a set of input points over a structured input domain to generate a set of output points in an output domain.

FIG. 4 depicts an example of a traditional discrete convolution technique, having an efficiency and effectiveness that relies on the fact that the input data 506 appears naturally in a dense grid structure. For example, the input data may be sensor data including a two-dimensional grid for images, a three-dimensional grid for videos, etc. The discrete convolution depicted in FIG. 4 can apply a static filter 504, also referred to as a kernel, having a kernel function g. The static filter 504 includes a predetermined kernel size.

By way of example, many convolutional neural networks use discrete convolutions (i.e., convolutions defined over a discrete domain) as basic operations. The discrete convolutions may be defined over a discrete domain as shown in equation 1.

$$h[n]=(f*g)[n]=\Sigma_{m=-M}^{M}f[n-m]g[m]$$ Equation 1

In Equation 1, $f: \mathcal{G} \rightarrow \mathbb{R}$ and $g: \mathcal{S} \rightarrow \mathbb{R}$ are functions defined over a support domain of finite integer set: $\mathcal{G}=\mathcal{Z}^D$ and $S=\{-M, -M+1, \ldots, M-1, M\}^D$, respectively.

In this particular example, the kernel, for each computation, operates over nine points from the input data defined by a feature function fN(i) corresponding to the kernel function g. The feature function $f$ can be applied to determine a subset of input points for which the kernel function g is to generate an output feature. The kernel function can generate an output feature, computed for the subset of points defined by the feature function. After an output feature is calculated using the feature function for a first subset of points, the feature function is used to select a next subset of points having the same number of points at the first subset. By way of example, the feature function may define a sliding window that is used to select subset of points until all of the points in the input are used to compute an output feature. In this manner, the input data is effectively divided into a number of tiles comprising portions of the input data having a predefined and uniform sized rectangle or box (e.g., depending on whether the imagery is two-dimensional or three-dimensional). The tiles may be overlapping or non-overlapping. The kernel function can be applied to compute an output feature for each output point in an output domain, where each output point corresponds to an input point in the input domain. FIG. 4 depicts output data 508 including a set of output features in an output domain that have been computed over the set of input features in input data 506 and the input domain using the kernel function g. Each output point in the set of output features has a value calculated with the kernel function over nine points in the input data.

Figure 5:
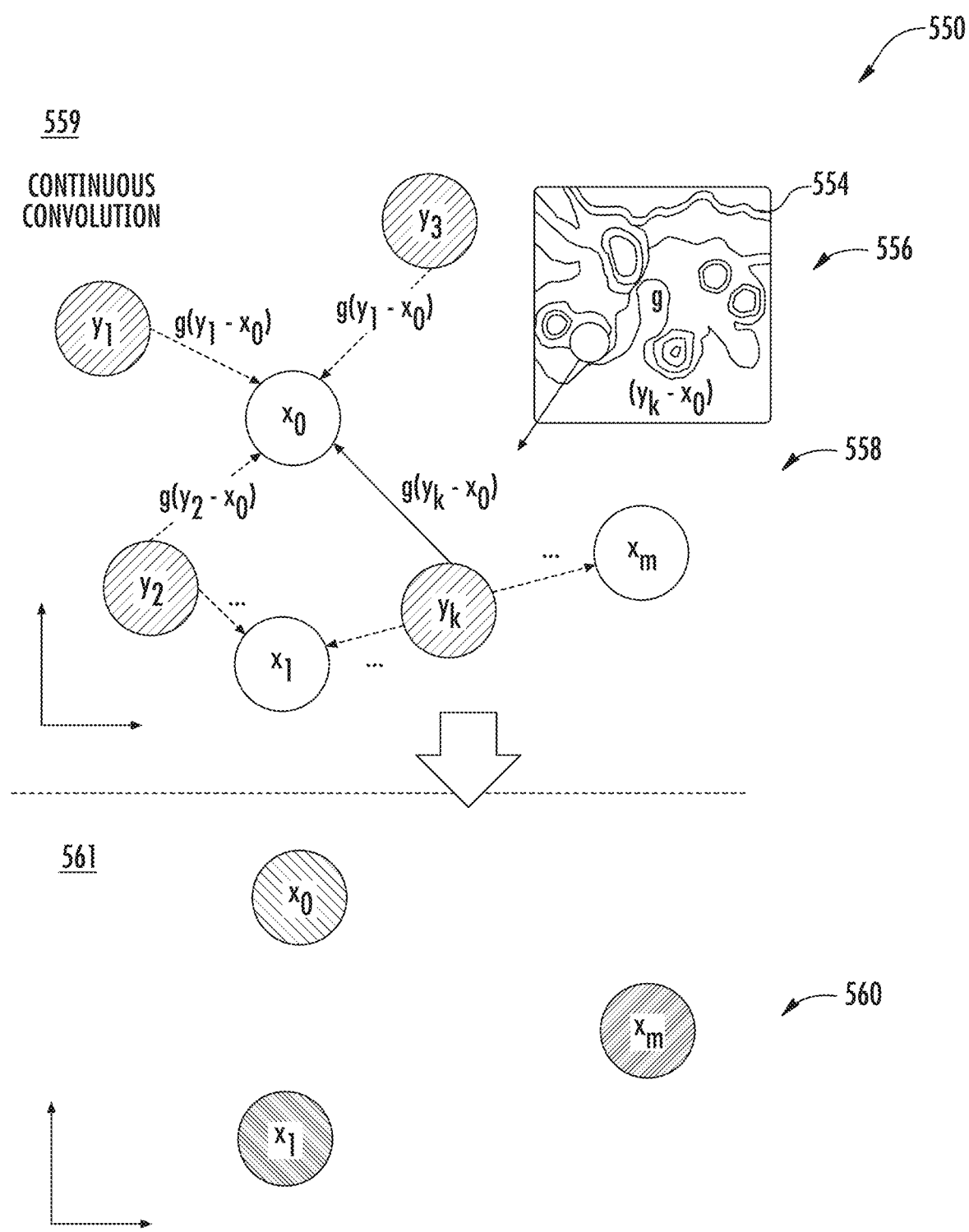
FIG. 5 depicts an example of continuous convolution over unstructured data in a continuous input domain to generate a set of output points in an output domain according to example embodiments of the present disclosure.

While effective for inputs having a fixed graph or grid type structure, discrete convolutions using a filter having a fixed kernel size may not be suitable or effective for inputs without such a dense grid type structure. FIG. 5, for example, depicts input data 558 having an arbitrary distribution of input points y1, y2, . . . yk over an input domain. For example, each input point may correspond to a point cloud generated by a LIDAR sensor, where each point cloud includes three-dimensional data for a detected object. It will be appreciated, however, that while the disclosed embodiments are primarily described with respect to point clouds, the described techniques may be applicable to any non-structured or non-grid structured input or other type of uneven distribution. Utilizing discrete convolutions that are defined by fixed kernel to determine a fixed set of points adjacent to a selected point in the output domain may not be effective to perform convolution on such data. By way of example, some output points may not have a corresponding set of input features and the support domain from which an output feature can be computed using the kernel.

FIG. 5 depicts a continuous convolution technique in accordance with embodiments of the present disclosure. In this example, continuous convolution is performed for a selected output point in the output domain using continuous convolution over the set of input points in the input domain. More particularly, FIG. 5 depicts a set of output points 560 including output points X0, X1, . . . Xm. The output feature for each output point is computed using continuous convolution based on a filter that is continuous over the input domain. In this example, continuous filter 554 includes a kernel function g which is defined continuously over the input domain 559. The kernel function is defined for arbitrary points in the continuous support domain 559. Because the kernel function is not constrained to a fixed graph structure, the continuous convolution approach has the flexibility to output features at arbitrary points over the continuous support domain 559. The kernel function g is continuous given the relative location in the support domain 559, and the input/output points can be any points in the continuous support domain 559, as well as can be different.

More particularly, FIG. 5 illustrates the kernel function g is defined continuously over the support domain 559 so that an arbitrary set of input points y1, y2, . . . yk can be selected according to the kernel function for computing output feature for an output point x0, x1, . . . xm. The kernel may specify that every input be point be used to calculate an output feature in some examples. In other examples, the kernel may specify that a subset of points be used to calculate a feature for an output point. Different input points and numbers of input points may be used to compute output features for different output points. In the described example, the output feature for output point x0 is computed based on input points y1, y2, y3, and yk. The output feature for point x1 is computed based on input features at input points y2 and yk. The output feature for output point xm is computed based on input feature yk. In another example, each output feature may be computed using all of the input features.

The continuous convolution depicted in FIG. 5 has a continuous filter 554 including a kernel g that is defined for arbitrary points in the continuous support domain 559. In this manner, kernel can be used to generate output features at arbitrary points over the continuous support domain 559. Moreover, an output feature can be computed for an output point for which there is no corresponding input feature in the input domain. For example, output points x0 and x1 have no corresponding input feature in the support domain 559.

Figure 6:
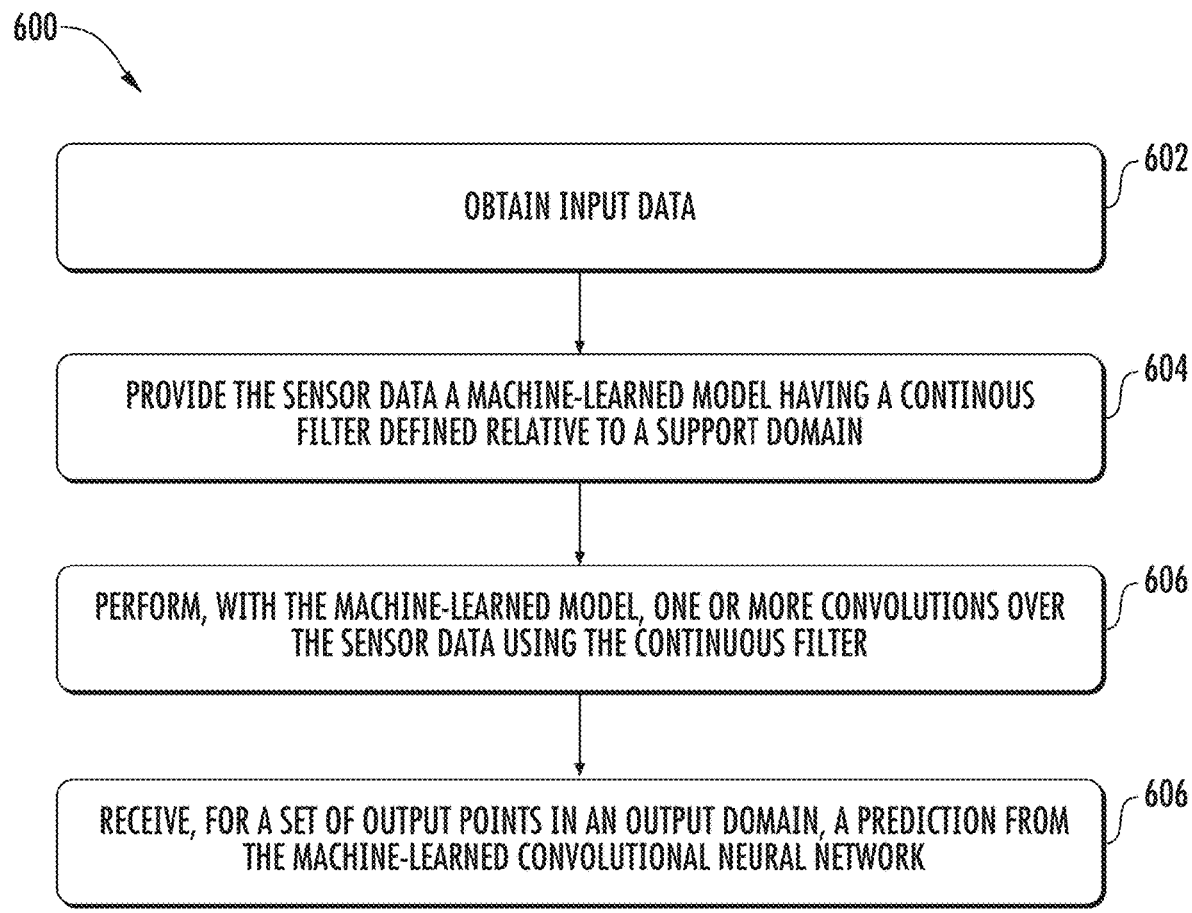
FIG. 6 depicts a flowchart diagram of an example process of generating predictions using a machine-learned continuous convolutional neural network according to example embodiments of the present disclosure.

FIG. 6 is a flowchart diagram depicting an example process 600 of generating predictions using a machine-learned model in accordance with embodiments of the disclosed technology. The machine-learned model may include one or more continuous convolutional neural networks in accordance with embodiments of the disclosed technology. One or more portions of process 600 (and other processes described herein) can be implemented by one or more computing devices such as, for example, the computing devices 110 within vehicle computing system 102 FIG. 1, or example computing system 300 of FIG. 3. Moreover, one or more portions of the processes described herein can be implemented as an algorithm on the hardware components of the devices described herein (e.g., as in FIGS. 1 and 2) to, for example, generate predictions based on input sensor data such as imagery. In example embodiments, process 600 may be performed by a prediction generator 128 of computing system 102.

At 602, a computing system including one or more processors can obtain input data. In some implementations, the input data may be sensor data received from a sensor positioned relative to an autonomous vehicle. In some embodiments, the sensor data is LIDAR data from one or more LIDAR sensors positioned on or in the autonomous vehicle, RADAR data from one or more RADAR sensors positioned on or in the autonomous vehicle, or image data such as visible spectrum imagery from one or more image sensors (e.g., cameras) positioned on or in the autonomous vehicle. In some embodiments, a perception system implemented in the vehicle computing system, such as perception system 103 of FIG. 1, can generate the sensor data received at 602 based on image sensor data received from one or more image sensors, LIDAR sensors, and/or RADAR sensors of a sensor system, such as sensor system including sensors 101 of FIG. 1. Although reference is made to object detection, object classification, or motion estimation for autonomous vehicles, it will be appreciated that the continuous convolution techniques described herein can be used for other applications.

In some embodiments, the sensor data may include unstructured input data or non-grid structured input data. Unstructured input data may not have a grid structure over its continuous support domain. Examples of unstructured input data may include three-dimensional point clouds of LIDAR data or other input data having an uneven distribution of input points in the support domain. In some examples, the input data is structured in multidimensional Euclidean space.

At 604, the computing system can provide the sensor data to a machine-learned model having a continuous filter defined relative to a support domain. In some implementations, the machine-learned model may include one or more continuous convolutional neural networks. For example, the continuous convolutional neural network may include one or more continuous convolution layers. A continuous convolution layer may be configured to perform convolutions over the sensor data or other input data using a continuous filter relative to a support domain. In some implementations, the continuous filter may include a parametric continuous kernel. The parametric continuous kernel can be defined for arbitrary points in a continuous support domain. In some examples, the parametric continuous kernel may comprise a multilayer perceptron. The parametric continuous kernel may be configured as an approximator. The parametric continuous kernel can span the full continuous support domain while remaining parameterized by a finite number of parameters. In other examples, the parametric continuous kernel may include a polynomial function.

At 606, the computing system can perform one or more convolutions over the input sensor data using the continuous filter. At least one continuous convolution layer of the convolutional neural network can be used to perform the one or more convolutions. A multilayer perceptron can be used to approximate the continuous filter in some implementations.

In some examples, locality can be applied when performing one or more parametric continuous convolutions by constraining the influence of a parametric continuous kernel based on distance is associated with an output point. For instance, the influence of the kernel may be constrained to points close to an output point. In some examples, the influence of the kernel function is constrained using a modulating window function. In some implementations, this can be accomplished by constraining the cardinality of the kernel function's local support domain and keeping only non-zero kernel values for its K-nearest neighbors. In another example, a receptive field can be used to keep non-zero kernel values for points within a fixed radius. In some implementations, the weight tensor can be decomposed into two tensors including a linear weight matrix for input transformation and an evaluation through the multilayer perceptron. With this optimization, a reduced number kernel evaluations may be computed and stored. In some examples, the parametric kernel function can be shared across different continuous convolution layers, thus only requiring the kernel function to be evaluated once for all layers.

At 608, the computing system can receive, for a set of output points in an output domain, a prediction from the machine-learned model. By way of example, the prediction may be an object classification or motion estimation for an object detected in an environment external to the autonomous vehicle. In some examples, one or more prediction from the machine-learned model may be used to generate state data by the perception system 103. The state data may be provided to prediction system 104 and/or motion planning system 105. The motion planning system can determine one or more motion plans for an autonomous vehicle based on information about the current locations of proximate objects and/or predictions about the future locations of proximate objects.

Equation 2 sets forth an example definition for continuous convolution according to example embodiments of the disclosed technology.

$$h(x)=(f*g)(x)=\int_{-\infty}^{\infty}f(y)g(x-y)dy \quad \text{Equation 2}$$

In Equation 2, the kernel $g: \mathcal{S} \rightarrow \mathbb{R}$ and the feature $f: g \rightarrow \mathbb{R}$ are defined as continuous functions over the support domain $G=\mathbb{R}^D$ and $S=\mathbb{R}^D$, respectively.

Continuous convolutions as depicted in Equation 2 may utilize an integration that is analytically tractable. Such an integration may be difficult for real-world applications, where the input features can be complicated and non-parametric, and observations can be sparse points sampled over a continuous support domain.

According to some embodiments, a continuous convolution operator can be derived. More particularly, for example, given continuous functions $f$ and $g$ with a finite number of input points $y_i$ sampled from the support domain, a continuous convolution at an arbitrary point x can be approximated as shown in Equation 3.

$$h(x) = \int_{-\infty}^{\infty} f(y)g(x-y)dy \approx \sum_{i}^{N} \frac{1}{N} f(y_i)g(x-y_i) \quad \text{Equation 3}$$

With a continuous convolution is defined in Equation 3, a continuous convolutional kernel function g can be constructed. In accordance with example embodiments, parametric continuous functions can be used to model the continuous kernel function g. Such an approach may be referred to as parametric continuous convolution. In some examples, a multilayer perceptron (MLP) can be used as an approximator. Multilayer perceptrons are expresssive and capable of approximating continuous functions over $\mathbb{R}^n$. Accordingly, a continuous kernel function g can be defined as shown in equation 4.

$$g(z;\theta)=MLP(z;\theta) \qquad \text{Equation 4}$$

The kernel function $g(z;\theta): \mathbb{R}^D \to \mathbb{R}$ spans the full continuous support domain while remaining parameterizable by a finite number of parameters. In other examples, other choices such as polynomials may be used. Low-order polynomials may be less expressive in some implementations. Learning high-order polynomials May be numerically unstable for back propagation-based learning.

Based on the parametric continuous convolutions as defined in Equation 4, a new convolution layer can be provided in accordance with example embodiments of the disclosed technology. Moreover, a deep learning architecture can be provided using this new convolution layer.

The input points in the output points of a parametric continuous convolution layer as described herein can be different. This may have particular applicability for many practical applications, where it is may be desired to make dense predictions based on partial observations. Moreover, this approach may allow the abstraction of information from redundant input points (i.e., pooling).

In some implementations, the input of each convolution layer can include three parts. For example, the input of each convolution layer can include: an input feature vector $\mathcal{F}=\{f_{in,j} \in \mathbb{R}^F\}$; the associated locations in the support domain $S=\{y_j\}$; and the output domain locations $\mathcal{O}=\{x_i\}$. For each layer, the kernel function $g_{d,k}\{y_i-x_j;\theta\}$ can be evaluated for all $x_1 \in \mathcal{S}$ S and all $y_i \in \mathcal{O}$, given the parameters θ. Each element of the output feature vector can then be computed as shown in Equation 5.

$$h_{k,i}=\Sigma_d^F \Sigma_j^N g_{d,k}(y_i-x_j)f_{d,j} \qquad \text{Equation 5}$$

In equation 5, N is the number of input points, M is the number of output points, and D is the dimensionality of the support domain. F and O can be the predefined input and output feature dimensions, respectively. In some examples, these may be hyperparameters of the continuous convolution layer.

One or more parametric continuous convolution layers may be used as building blocks to construct a family of deep neural networks which operate on unstructured data defined in a topological group under addition. In some examples, the neural networks can operate on unstructured data defined in multidimensional Euclidean space. In other examples, other space definitions may be used. In some examples, a convolutional neural network can take input features and their associated positions in the support domain as input. Hidden representations can be generated from successive parametric continuous convolution layers. Batch normalization, nonlinearities, and residual connections can be provided between layers. In some examples, pooling can also be employed over the support domain to aggregate information. In some implementations, residual connection can be added between parametric continuous convolution layers to help convergence.

In some examples, the building blocks including parametric continuous convolution layers can be differentiable operators, such that the networks can be learned through back propagation, according to Equation 6.

$$\frac{\partial h}{\partial \theta}=\frac{\partial h}{\partial g} \cdot \frac{\partial g}{\partial \theta}=\sum_d^F \sum_j^N f_{d,j} \cdot \frac{\partial g}{\partial \theta} \qquad \text{Equation 6}$$

In some examples, locality can be enforced in an effort to provide continuous convolution over a limited kernel size. For example, locality can be enforced in some examples within parametric continuous convolutions by constraining an influence of the kernel function g to points close to x, as shown in Equation 7, for example.

$$g(z)=MLP(z)w(z) \qquad \text{Equation 7}$$

In equation 7, w(z) Is a modulating window function. A modulating window function can be achieved in multiple ways. For example, the cardinality of the functions local support domain can be constrained and only non-zero kernel values for the K-nearest neighbors to a selected point can selected according to Equation 8.

$$w(z)=1_{\chi \in KNN(S,x)} \qquad \text{Equation 8}$$

In another example, a receptive field can be used and nonzero kernel values can be kept for points within a fixed radius according to Equation 9:

$$r:w(z)=1_{\|z\|_2 < r} \qquad \text{Equation 9}$$

In some examples, for each continuous convolution layer, the kernel function can be evaluated a number of times equal to N×|S|×F×O, for example. In computing the number of times, $W \in \mathbb{R}^{N \times |S| \times F \times O}$ can be the cardinality of the support domain, and the intermediate weight tensor can be stored for backpropagation. In some implementations, evaluating the kernel function this many times may require a relatively large amount of computing resources, particularly where the number of points and the feature dimension can be large.

Utilizing this locality enforcing formulation, the cardinality of S can be constrained. Furthermore, in some implementations, this computation can be factorized if the kernel function value across different output dimensionality is shared. For example, the weight tensor $W \in \mathbb{R}^{N \times |S| \times F \times O}$ can be decomposed into two decomposition tensors $W_1 = \mathbb{R}^{F \times O}$ and $W_2 = \mathbb{R}^{N \times |S| \times F \times O}$, where $W_1$ is a linear weight matrix for input transformation and $W_2$ is evaluated through the multi layer perceptron. In some implementations with this optimization, the number of kernel evaluations that are computed and stored can be reduced to N×|S|×O. In some cases, the parameterized kernel function g can be shared across different layers, such that it can be evaluated once for all layers.

A continuous convolution layer as described can be used to construct other types of convolution layers using applications of the described approach. For example, if the input points are sampled over a standard finite two-dimensional grid, conventional two-dimensional convolutions can be recovered. If the support domain is defined as concatenation of the spatial vector and feature vector, and the kernel function g is a gaussian kernel, a bilateral filter can be recovered. If the support domain is defined as the neighboring vertices of the node, a standard first order spatial graph convolution can be recovered.

Figure 7:
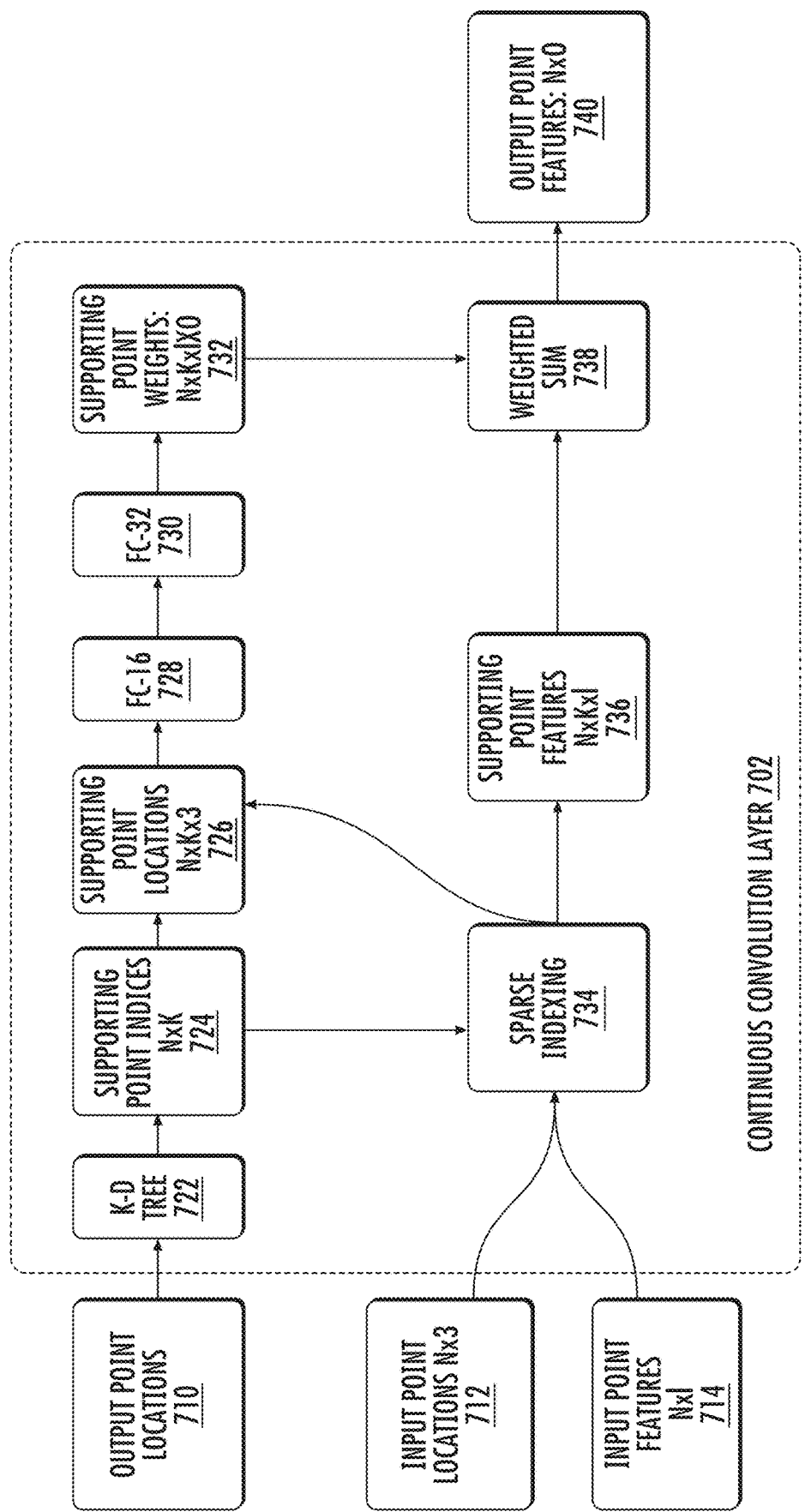
FIG. 7 depicts a block diagram of an example continuous convolution layer according to example embodiments of the present disclosure.

FIG. 7 is a block diagram depicting an example of a continuous convolution layer 702 according to example embodiments of the disclosed technology. Continuous convolution layer 702 can be a parametric continuous convolution layer and can be included within the machine-learned model 310 or 340 as previously described. Continuous convolution layer 702 may be part of a continuous convolutional neural network in some implementations. In some examples, multiple continuous convolution layers 702 may be used. For example, multiple continuous convolution layer 702 may include residual connections between layers to help convergence. In some examples, batch normalization, non-linearities, and residual connections between layers can be added.

Layer 702 is configured to receive a set of input point locations 712 (e.g., input point coordinates). In this example, the input point locations are input point coordinates provided as a set of coordinates having a dimension N×3. Layer 702 is additionally configured to receive a set of input point features 714. In this example, the input point features are provided as a set of features having a dimension N×1.

Continuous convolution layer 702 is further configured to receive a set of output point locations 710. In some examples, the output point locations can be provided as a set of output point coordinates. The set of output point locations 710 is provided to a K-dimensional tree component 722. The K-dimensional tree component 722 can be configured to determine a set of support point indices 724 for the set of output point locations 710. In one example, the K-dimensional tree component 722 may select a subset of support points for each output point location using a K-dimensional tree analysis. In this example, the support point indices are provided as a set of support point indices having a dimension N×K.

The set of input point locations 712 and the set of input point features 714 are provided to a sparse indexing component 734. Additionally, the support point indices 724 are provided from K-dimensional tree component 722 to sparse indexing component 734. Sparse indexing component 734 generates a first output including a set of support point locations (e.g., support point coordinates). In this example the set of support point locations is a set of support point coordinates having a dimension N×K×3. The set of support point locations is provided to one or more first fully convolution layers 728. In this example, the first fully convolutional layer 728 includes 16 dimensions. The output of the first fully convolutional layer 728 is provided to a second fully convolutional layer 730. In this example, the second fully convolutional layer 730 includes 32 dimensions. The output of the second fully convolutional layer is a set of support point weights including a support point weight corresponding to each of the support point locations 726. In this example, the support point weights have a dimension N×K×1×0.

Sparse indexing component 734 generates a second output including a set of support point features 736. In this example, the set of support point features has a dimension of N×K×1.

Weighted sum component 738 receives the set of support point features 736 from sparse indexing component 734, and the set of support point weights 732 from fully convolutional layer 730. Weighted sum component 738 applies the weighted sum to each of the support point features 736 based on the set of support point weights 732. The weighted sum component 738 generates a set of output point features 740 based on the weighted sum computation. In this example, the output point features have a dimension N×O.

Figure 8:
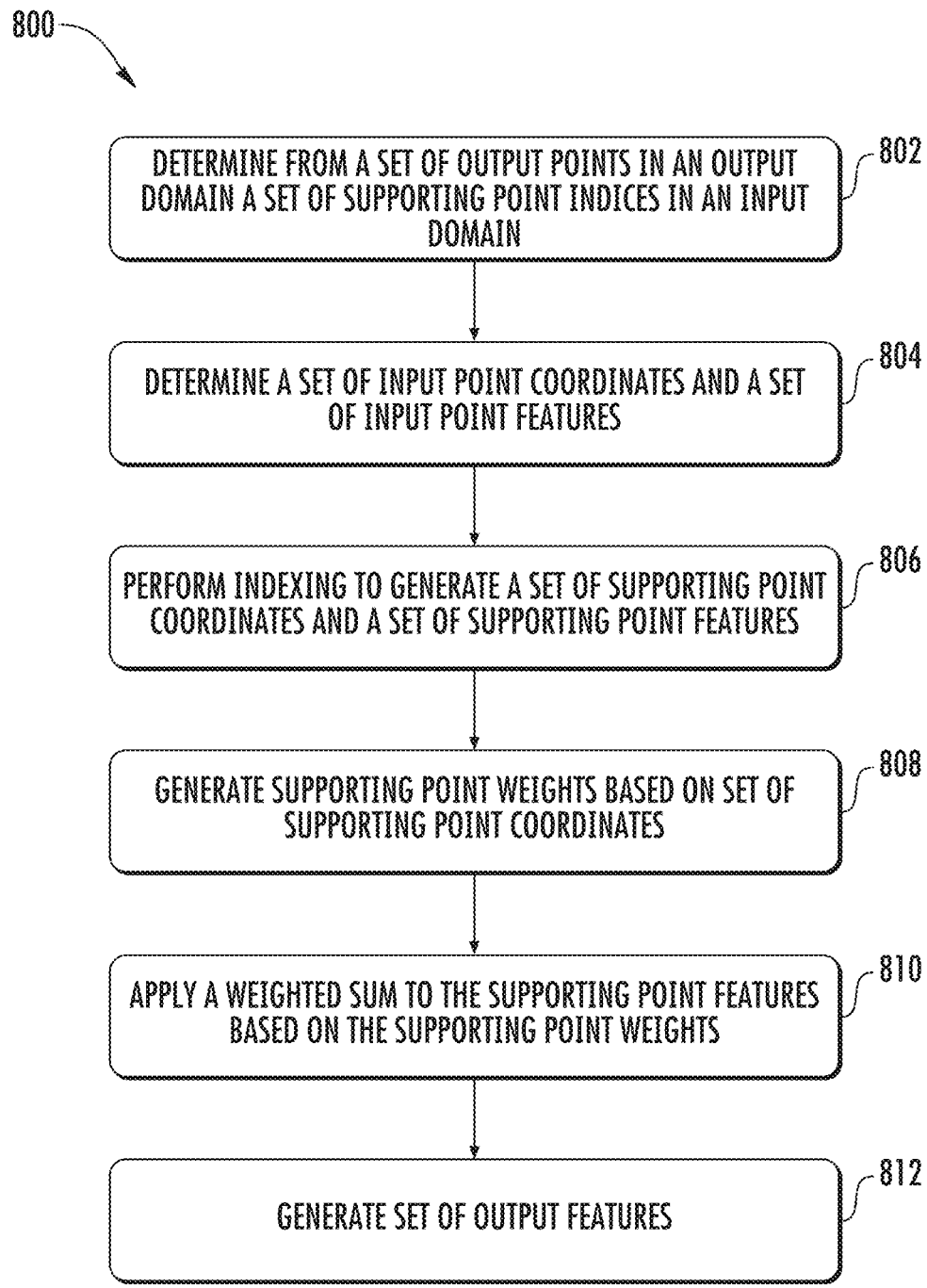
FIG. 8 depicts a flowchart diagram of an example process of generating output features from sensor data using continuous convolution according to example embodiments of the present disclosure.

FIG. 8 is a flowchart diagram depicting an example process 800 of generating a set of output features using a continuous convolutional neural network in accordance with example embodiments of the present disclosure. In some examples, process 800 may be performed for at least a portion of 606 of process 600.

At 802, a set of supporting point indices in an input domain is determined from a set of output points in an output domain. In some examples, the supporting point indices may be determined using a K-dimensional tree to select a subset of supporting points based on an output point coordinate.

At 804, the computing system determines a set of input point coordinates and a set of input point features. In example embodiments, the set of input point coordinates and a set of input point features may be determined from input sensor data.

At 806, indexing is performed using the set of supporting point indices, the set of input point coordinates, and the set of input point features. In some examples, indexing at 806 may include determining a set of supporting point coordinates based on the set of input point coordinates and the set of supporting point indices. In some examples, the set of supporting point coordinates is an example of a set of supporting point locations. Additionally, indexing at 806 may include determining a set of supporting point features based on the input point features and the supporting point indices.

At 808, a set of support point weights is generated based on the set of supporting point coordinates. In some examples, generating the supporting point weights at 808 may include applying one or more fully connected layers of a machine-learned model.

At 810, a weighted sum can be applied to the support point features based on the support point weights.

At 812, a set of output features can be generated from the support point features based on the weighted sum.

Figure 9:
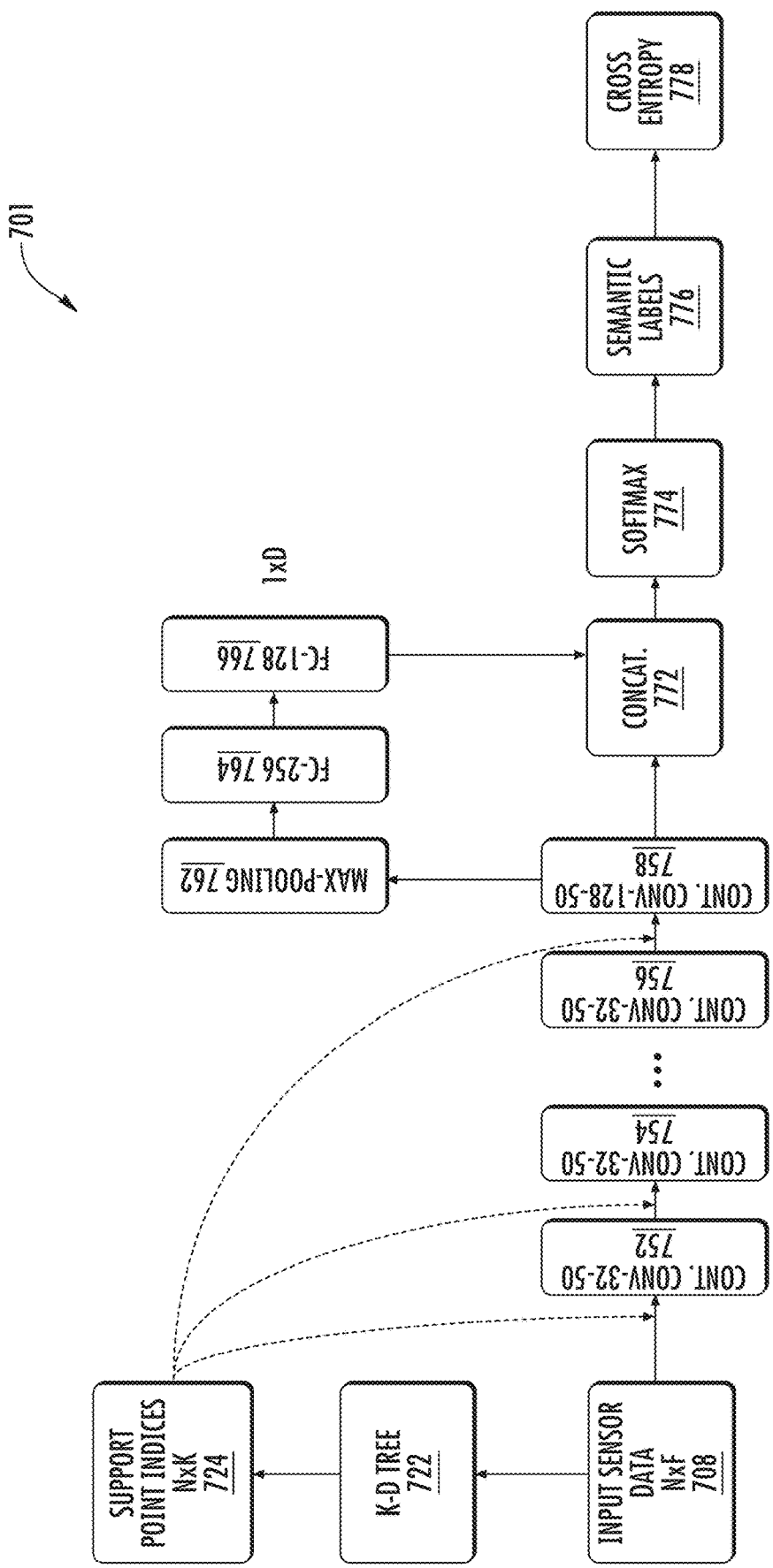
FIG. 9 depicts a block diagram of an example architecture of a parametric continuous convolutional neural network for semantic labeling according to example embodiments of the present disclosure.

FIG. 9 is a block diagram depicting an example of an architecture for a machine-learned model 701 including a deep parametric continuous convolutional neural network in accordance with example embodiments of the disclosed technology. In example embodiments, machine-learned model 701 may be used to generate semantic labels as part of an object classification task performed by an autonomous vehicle. However, it will be appreciated that similar models may be used for other tasks.

Machine-learned model 701 receives input sensor data 708. The input sensor data may include visible spectrum imagery captured by one or more cameras or other sensors, or other imagery such as LIDAR data. In this example, the input sensor data has a dimension N×F. The input sensor data 708 can be provided to K-dimensional tree component 722 which generates a set of support point indices having a dimension N×K.

The input sensor data 708 is provided as a first input to a first continuous convolution layer 752. The first continuous convolution layer 752 is part of a set of convolution layers including continuous convolution layers 754, 756, and 758. In one example, the set may include eight continuous convolution layers, but any number of continuous convolution layers may be used. The supporting point indices are provided as a second input to the first continuous convolution layer 752. The first continuous convolution layer 752 performs one or more continuous convolutions using the input sensor data and the supporting point indices. The first continuous convolution layer can use a continuous filter such as a parametric continuous kernel in accordance with example embodiments of the disclosed technology. The output of the first continuous convolution layer is provided to a second continuous convolution layer 754. The second continuous convolution layer 754 also receives the set of supporting point indices as a second input. The output of the second continuous convolution layer 754 is provided to an additional continuous convolution layer in the set. Each subsequent continuous convolution layer receives the output of a previous continuous convolution layer as a first input and the set of supporting point indices as a second input. In one example, each continuous convolution layer except for the final continuous convolution layer of the set has 32 dimensional hidden features followed by batch normalization and ReLU nonlinearity. The final continuous convolution layer 758 can have a dimension of 128 in some examples.

The output of the final continuous convolution layer 758 is provided to a max pooling component 762 as well and a concatenation component 772. The max pooling component 762 can pool similar features and provide an output to a first fully connected layer 764. Max pooling can be applied over all the points in the final continuous convolution layer 758 to obtain a global feature. In one example, the first fully connected layer 764 provides a 256 dimensional feature, but other dimensions may be used. The output of the first fully connected layer 764 is provided to the input of a second fully connected layer 766. In one example, the second set fully connected layer provides a 128 dimensional feature, but other dimensions may be used. The output of the second fully connected layer can also be provided to concatenation component 772. Concatenation component 772 can perform concatenation on the output of the final continuous convolution layer 758 and the output of the second fully connected layer 766. A global feature can be concatenated to the output feature of each point in the last layer, resulting in a 256 dimensional feature in some examples. The output of the concatenation component 772 is provided to a softmax component 774. The softmax component 774 can include a fully connected layer with softmax activation to produce a final output. In this example, the final output includes semantic labels for portions of the input sensor data based on the output of concatenation component 772. In some examples, a semantic label may be generated for each pixel or each point of a point cloud from the input data. The semantic label 776 can be provided to a cross entropy component 778 in one example. The cross entropy component 778 may apply back propagation to train the machine-learned model 701 in some implementations. In some examples, the network can be trained end to end with cross entropy loss, using an Adam optimizer, for example. Point-wise cross entropy loss can be used.

In one example, continuous convolution can be performed directly over all xyz-intensity LIDAR points as part of semantic labeling. In a specific implementation, a continuous convolutional neural network may include 16 continuous convolution layers with residual connections and ReLU nonlinearities. Spatial support can be provided in $1R^3$ to define a parametric continuous kernel. The continuous convolutional neural network can be trained with point wise cross entropy loss and an Adam optimizer.

In another example, continuous convolution can be performed over features extracted from a three-dimensional fully convolutional network for semantic labeling. In a specific implementation, the continuous convolutional neural network may include seven residual continuous convolution layers on top of a trained three-dimensional fully convolutional network model. End-to-end fine-tuning can be performed using an Adam optimizer for training. ReLU and batch normalization can be used in the continuous convolution layers.

As yet another example, a continuous convolutional neural network in accordance with example embodiments can be used for LIDAR based motion estimation, sometimes referred to as LIDAR flow. The input to the convolutional neural network may include two consecutive frames of LIDAR sweep data. The convolutional neural network may be configured to estimate the three-dimensional motion field for each point in the first frame, and to undo both the motion of the autonomous vehicle and the motion of dynamic objects. A ground truth autonomous vehicle motion can be computed through comprehensive filters that take GPS, IMU, as well as ICP based LIDAR alignment against pre-scanned three-dimensional geometry of a scene as input. A ground truth six degrees of freedom dynamics object motion can be estimated from the temporal coherent three-dimensional object tracklet, labeled by annotators in some examples. Combining these, a ground truth motion field can be obtained. This task may have application for multi-rigid transform alignment, object tracking, global pose estimation, etc.

In a specific example, a continuous convolutional neural network configured for motion estimation may include seven residual continuous convolution layers on top of the trained three-dimensional fully convolutional neural network model. ReLU nonlinearity can be removed and the continuous convolution layers can be monitored with MSE loss at every layer in some examples. The training objective function can be a mean square error loss between the ground truth flow vector and a prediction.

In accordance with some examples, a neural network may include one or more continuous fusion layers configured to fuse information from multi-modality data. A continuous fusion layer can generate a dense representation under one modality where a data point contains features extracted from two or more modalities. A nearest neighbors technique can be used to extract data points in a source domain based on a target domain in a different modality. Such an approach can overcome difficulties of multi-modal data fusion in situations where not all of the data points in one modality are observable in another modality. A continuous fusion approach may overcome problems associated with both sparsity in input data (e.g., sensor observations) and the handling of spatially-discrete features in some input data (e.g., camera-view images).

A target data point in a target domain may be received at a machine-learned model that includes one or more continuous fusion layers. From the target data point, a plurality of source data points in a source domain can be identified. A K-nearest neighbors approach can be used in example embodiments. In a K-nearest neighbors approach, a predetermined number of K data points can be identified that are closest to the target data point. In some examples, a calibration of sensors can be used to identify the K-nearest data points in a different modality to that of a target domain. For instance, sensor calibration may be used to generate a mapping between the target domain and the source domain based on a calibration of sensors associated with each domain. By way of example, a calibration between a camera image sensor associated and a LIDAR sensor may be used to generate a mapping between a source domain associated with the camera image sensor and a target domain associated with the LIDAR sensor.

A multi-layer perceptron approach can be used to fuse information from the plurality of source data points extracted from the source domain. By fusing information from the plurality of source data points, an unobserved feature at the target point can be "interpolated." In some examples, a multi-layer perceptron of a continuous fusion layer has an input including two parts. The first part of the multi-layer perceptron extracts the corresponding feature data points in the source domain, given the target data point in the target domain. The first part can fuse the information from the corresponding feature data points to generate a target feature at the target point. For a feature under continuous coordinates, interpolation can be used to determine the unobserved feature at the target point. The second part of the multi-layer perceptron can encode an offset between each source data point and the target data point. By encoding the offset, discrepancies (e.g., geometric information loss) due to the conversion between modalities can be compensated.

An example of representation of the compensation provided by encoding the offset between data points is set forth in Equation 10.

$$h_i = \Sigma_j \text{MLP}(\text{concat}[f_1, x_j - x_i])$$  Equation 10

In Equation 10, $f_i$ is the corresponding interpolated source modality's feature of point j. The difference $x_j - x_i$ is the offset from a source point j to the target point i. The concatenation concat(·) is the concatenation of multiple vectors. Accordingly, a continuous fusion approach can provide a concatenation of both feature vectors and coordinate vectors. Moreover, the aggregation of input data of different modalities can be performed by a multi-layer perceptron directly.

Figure 10:
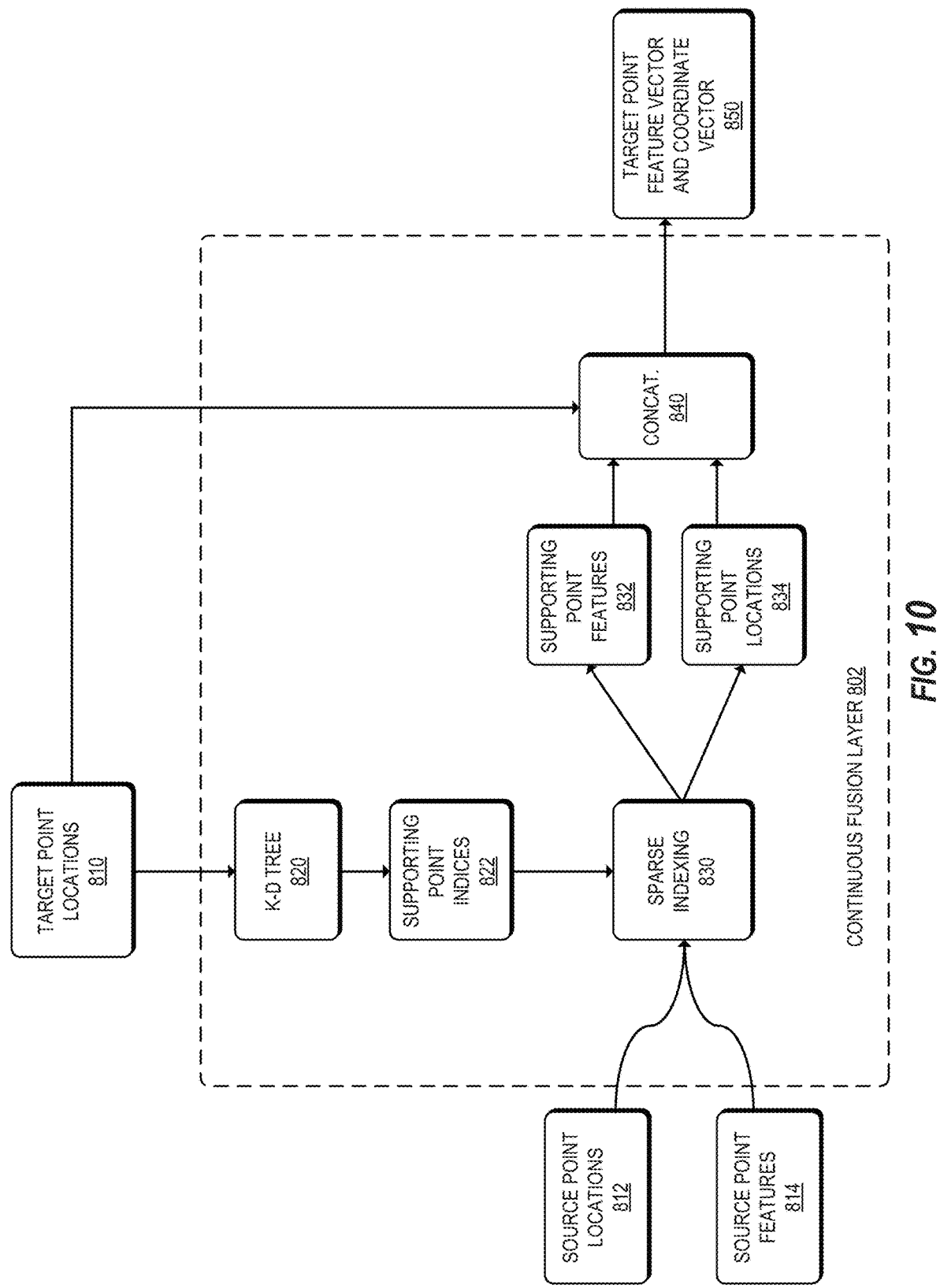
FIG. 10 depicts a block diagram of an example continuous fusion layer according to example embodiments of the present disclosure.

FIG. 10 is a block diagram depicting an example of a continuous fusion layer 802 according to example embodiments of the disclosed technology. Continuous fusion layer 802 can be included within one or more machine learned models including one or more neural networks, for example. In some examples, multiple continuous fusion layers may be used. For example, multiple continuous fusion layers 802 may include residual connections between layers to help convergence. In some examples, batch normalization, non-linearities, and residual connections between layers can be added.

Continuous fusion layer 802 is configured to receive a set of source point locations 812 (e.g., source point coordinates) and a set of source point features 814. The source point locations can be source point coordinates provided as a set of coordinates having a particular dimension.

Continuous fusion layer 802 is further configured to receive a set of target point locations 810. In some examples, the target point locations can be provided as a set of target point coordinates. The set of target point locations 810 is provided to a K-dimensional tree component 820. The K-dimensional tree component 820 can be configured to determine a set of supporting point indices 822 for the set of target point locations 810. In one example, the K-dimensional tree component 820 may select a subset of source point locations for each target point location using a K-dimensional tree analysis. For instance, the K-dimensional tree component 820 may identify a set of K-nearest neighbors for each output point location. The set of K-nearest neighbors may be a predetermined number of nearest neighbors for each output point location.

The set of source point locations 812 and a set of source point features 814 are provided to a sparse indexing component 830. Additionally, the supporting point indices 822 are provided from K-dimensional tree component 822 to sparse indexing component 830. Sparse indexing component 830 generates a first output including a set of supporting point locations (e.g., support point coordinates). The set of supporting point locations 834 is provided to a concatenation component 840. Sparse indexing component 830 generates a second output including a set of supporting point features 832. The set of supporting point features 832 is provided to the concatenation component 840. Additionally, the target point locations 810 are provided to the concatenation component 840. Concatenation component 840 can perform concatenation on the supporting point features 832 based on the supporting point locations 834 and target point locations 810. Concatenation component 840 generates an output for each target point location. The output for each target point location can include a concatenation of the features at each corresponding supporting point location. The output for each target point includes a feature vector and coordinate vector 850.

A continuous fusion layer such as that illustrated in FIG. 10 may be used within any layer of a machine-learned model, such as at an early, middle, and/or late layer in a set of layers of a model. A continuous fusion layer may be used with one or more convolutional layers in some examples. In other examples, a continuous fusion layer may be used independently of a continuous convolution layer.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An autonomous vehicle, comprising:
   one or more sensors that generate sensor data relative to the autonomous vehicle;
   one or more processors; and
   one or more non-transitory computer-readable media that store instructions for execution by the one or more processors to cause the autonomous vehicle to perform operations, the operations comprising:
   providing sensor data from the one or more sensors to a machine-learned convolutional neural network including one or more continuous convolution layers;
   performing one or more convolutions over the sensor data with at least one of the one or more continuous convolution layers using a parametric continuous kernel, wherein the parametric continuous kernel is continuous relative to a support domain associated with the sensor data;

receiving a prediction from the machine-learned convolutional neural network based at least in part on the one or more convolutions performed over the sensor data; and controlling a motion of the autonomous vehicle based at least in part on the prediction.

2. The autonomous vehicle of claim 1, wherein the operations further comprise:

determining, based at least in part on the sensor data, a set of input features and a corresponding set of input point locations in a support domain;

determining, based at least in part on a set of output point locations in an output domain and the corresponding set of input point locations, a set of supporting point locations in the support domain; and generating with the at least one of the one or more continuous convolution layers, a set of output features in the output domain based at least in part on the set of input features, the set of corresponding input point locations, and the set of supporting point locations.

3. The autonomous vehicle of claim 2, wherein the operations further comprise:

determining, based at least in part on the set of supporting point locations, a set of supporting point weights associated with the set of supporting point locations;

determining, based at least in part on the set of input point features and the set of output point locations, a set of supporting point features; and applying a weighted sum to the set of supporting point features based on the set of supporting point weights in order to generate the set of output features in the output domain.

4. The autonomous vehicle of claim 1, wherein:

the support domain is a continuous support domain; and the parametric continuous kernel includes a parametric kernel function spans a full continuous vector space of the continuous support domain.

5. The autonomous vehicle of claim 4, wherein:

the parametric kernel function is configured to output features at arbitrary points over the continuous support domain; and the sensor data includes an uneven distribution of points in the continuous support domain.

6. The autonomous vehicle of claim 1, wherein:

performing one or more convolutions over the sensor data comprises constraining an influence of the parametric continuous kernel based on one or more distances associated with a set of output point locations in an output domain.

7. The autonomous vehicle of claim 1, wherein:

the sensor data comprises a three-dimensional point cloud; and the prediction includes at least one of a semantic label or a motion estimation associated with a plurality of portions of the sensor data.

8. One or more non-transitory computer-readable media that store a machine-learned convolutional neural network that comprises one or more convolution layers, wherein at least one of the one or more convolution layers is configured to perform convolutions over input data with a parametric continuous kernel, wherein the parametric continuous kernel is continuous relative to a support domain associated with the input data, and wherein an output of the machine-learned convolutional neural network controls a motion of an autonomous vehicle.

9. The one or more non-transitory computer-readable media of claim 8, wherein the input data comprises unstructured input data.

10. The one or more non-transitory computer-readable media of claim 8, wherein the input data comprises non-grid structured input data.

11. The one or more non-transitory computer-readable media of claim 8, wherein the input data is structured in multi-dimensional Euclidian space.

12. The one or more non-transitory computer-readable media of claim 8, wherein the parametric continuous kernel comprises a multilayer perceptron.

13. The one or more non-transitory computer-readable media of claim 8, wherein the parametric continuous kernel comprises a polynomial function.

14. The one or more non-transitory computer-readable media of claim 8, wherein the one or more convolution layers comprise a plurality of convolution layers, and wherein the machine-learned convolutional neural network comprises one or more residual connections between at least two of the plurality of convolution layers.

15. The one or more non-transitory computer-readable media of claim 8, wherein, for the one or more convolution layers, an influence of the parametric continuous kernel is constrained by a modulating window function.

16. The one or more non-transitory computer-readable media of claim 15, wherein the modulating window function retains only non-zero kernel values for K-nearest neighbors.

17. The one or more non-transitory computer-readable media of claim 8, wherein, for the at least one convolution layer, a weight tensor of the parametric continuous kernel is decomposed into two or more decomposition tensors.

18. A computing system, comprising:

one or more processors;

one or more non-transitory computer-readable media that store:

a machine-learned neural network that comprises one or more fusion layers, wherein at least one of the one or more fusion layers is configured to fuse input data of different modalities;

instructions for execution by the one or more processors to cause the computing system to perform operations, the operations comprising:

receiving, at the machine-learned neural network, a target data point in a target domain having a first modality;

extracting with the machine-learned neural network a plurality of source data points from a source domain having a second modality based on a distance of each source data point to the target data point;

fusing information from the plurality of source data points in the one or more fusion layers to generate an output feature at the target data point in the target domain; and controlling a motion of a vehicle based at least in part on the output feature.

19. The computing system of claim 18, wherein the one or more fusion layers comprises:

one or more multi-layer perceptrons each having a first portion and a second portion, the first portion of each multi-layer perceptron configured to extract the plurality of source data points from the source domain given the target data point in the target domain, the second portion of each multi-layer perceptron configured to encode an offset between each of the plurality of source data points in the source domain and the target data point in the target domain.

* * * * *